US008338040B2

(12) United States Patent
Matsusue

(10) Patent No.: US 8,338,040 B2

(45) Date of Patent: Dec. 25, 2012

(54) FUEL CELL SYSTEM AND METHOD OF OPERATING FUEL CELL SYSTEM

(75) Inventor: Masaaki Matsusue, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/260,015

(22) PCT Filed: Jul. 20, 2010

(86) PCT No.: PCT/JP2010/062177

§ 371 (c)(1), (2), (4) Date: Sep. 23, 2011

(87) PCT Pub. No.: WO2011/024581

PCT Pub. Date: Mar. 3, 2011

(65) Prior Publication Data

US 2012/0189925 A1 Jul. 26, 2012

(30) Foreign Application Priority Data

Aug. 26, 2009 (WO) .................. PCT/JP2009/064881

(51) Int. Cl.

*H01M 8/02* (2006.01)
*H01M 8/04* (2006.01)
*H01M 8/10* (2006.01)

(52) U.S. Cl. ......................... 429/414; 429/428; 429/444

(58) Field of Classification Search .................. 429/410, 429/414, 429, 444

See application file for complete search history.

(56) References Cited

U.S. PATENT DOCUMENTS

2006/0286418 A1* 12/2006 Saeki et al. .................... 429/22
2007/0231636 A1* 10/2007 Alp et al. ....................... 429/22

FOREIGN PATENT DOCUMENTS

JP 2004-179000 A 6/2004
JP 2004-335444 A 11/2004
JP 2005-116220 A 4/2005
JP 2005-222854 A 8/2005
JP 2005-327596 A 11/2005

(Continued)

OTHER PUBLICATIONS

IPDL Machine Translation of the Detailed Description of JP 2007-288850A Nov. 2007.*

(Continued)

*Primary Examiner* — Gregg Cantelmo

(74) *Attorney, Agent, or Firm* — Kenyon & Kenyon LLP

(57) ABSTRACT

A fuel cell system in which excess water vapor or nitrogen gas is prevented from remaining inside the fuel cell in intermittent operation. The fuel cell system includes an estimation unit that estimates a water vapor amount and a nitrogen gas amount at a plurality of predetermined positions inside the electrolyte membrane and the reaction gas flow channel of at least one unit cell of the fuel cell stack; and an operation control unit that compares, during an operation stop of intermittent operation, the water vapor amount and/or the nitrogen gas amount at each of the predetermined positions with a threshold for each of the predetermined positions, and supplies a gas to the reaction gas flow channel and discharges water vapor and nitrogen gas from inside the fuel cell when the water vapor amount and/or the nitrogen gas amount exceeds the threshold at at least one of the positions.

6 Claims, 35 Drawing Sheets

FOREIGN PATENT DOCUMENTS

| | | | |
|---|---|---|---|
| JP | 2005-339845 | A | 12/2005 |
| JP | 2006-019121 | A | 1/2006 |
| JP | 2007-115492 | A | 5/2007 |
| JP | 2007288850 | A | * 11/2007 |
| JP | 2008-041505 | A | 2/2008 |
| JP | 2008-293805 | A | 12/2008 |
| JP | 2009-004151 | A | 1/2009 |
| JP | 2009-211919 | A | 9/2009 |
| JP | 2009-211940 | A | 9/2009 |
| WO | 2008/056518 | A1 | 5/2008 |

OTHER PUBLICATIONS

International Search Report mailed Aug. 24, 2010 of PCT/JP2010/062177.

* cited by examiner

EXTERNAL AIR TEMPERATURE SENSOR
VEHICLE SPEED SENSOR
CONTROL UNIT
HUMIDIFIER
100
62
63
600
40
43
44
45
400
46
A
41
48
F2
P2
42
47
50
54
T1
T2
61
1
52
53
51
500
32
P1
34
30
31
33
F1
300

FUEL CELL SYSTEM AND METHOD OF OPERATING FUEL CELL SYSTEM

This is a 371 national phase application of PCT/JP2010/062177 filed 20 Jul. 2010, which claims priority to PCT/JP2009/064881 filed 26 Aug. 2009, the contents of which are incorporated herein by reference.

The present invention relates to a fuel cell system using water vapor amount estimation and nitrogen gas amount estimation in a solid polymer fuel cell and to a method of operating the fuel cell system.

BACKGROUND

It has been well known that in order to generate electricity with good efficiency with a solid polymer fuel cell, it is desirable that the electrolyte membrane be in an adequate humidified state and that no excess moisture be present inside the fuel cell. The technique described, for example, in Patent Document 1 is known for controlling the amount of moisture in the cell plane of the fuel cell. Patent Document 1 discloses the feature of adjusting at least one of pressure, humidity, flow rate, and pressure loss characteristic determined by the flow channel shape for a reaction gas (a general term for an oxidizing gas such as air and a fuel gas such as hydrogen gas) to control the distribution of moisture amount as water vapor or liquid droplets in the cell plane. Patent Documents 2 to 5 are other prior art documents.

Patent Document 1: Japanese Patent Application Publication No. 2004-335444
Patent Document 2: Japanese Patent Application Publication No. 2005-222854
Patent Document 3: Japanese Patent Application Publication No. 2009-004151
Patent Document 4: Japanese Patent Application Publication No. 2008-041505
Patent Document 5: Japanese Patent Application Publication No. 2005-339845

However, in an actual fuel cell, a large number of unit cells are stacked, the moisture amount differs along the stacking direction and the moisture amount also differs in the flow channel direction of the reaction gas flow channel in the cell plane. In this regard, in the configuration described in Patent Document 1, the moisture amount in the stacking direction of fuel cells or moisture amount in the flow channel direction of the reaction gas flow channel are not taken into account in the control process and the distribution of moisture amount inside the fuel cell is difficult to control with good accuracy.

Due to the increase in fuel consumption in recent years, the number of fuel cell systems in which intermittent operation of fuel cells is performed has increased. In the intermittent operation, the operation of an auxiliary device that supplies the reaction gases to the anode electrode and cathode electrode is stopped.

However, during the operation stop in intermittent operation, an excess amount of water vapor or nitrogen gas can remain as impurity inside the fuel cell. In such case, when the operation is thereafter started, the supply of reaction gases can be insufficient, the cell voltage can decrease, and fuel consumption can increase under the effect of the remaining water vapor or nitrogen gas.

SUMMARY

The present invention has been created with the aforementioned issues in view and it is an object thereof to prevent excess water vapor or nitrogen gas from remaining inside the fuel cell in intermittent operation.

In order to attain the above-described object, the present invention provides a fuel cell system including a fuel cell having a cell stack formed by stacking a plurality of unit cells each having an anode electrode, a cathode electrode, an electrolyte membrane located between the anode electrode and the cathode electrode, and a reaction gas flow channel, the fuel cell system including: an estimation unit that estimates a water vapor amount and a nitrogen gas amount at a plurality of predetermined positions inside at least one of the electrolyte membrane and the reaction gas flow channel; and an operation control unit that compares, during an operation stop of intermittent operation, at least either of the water vapor amount or the nitrogen gas amount at each of the predetermined positions that has been estimated by the estimation unit with a threshold for each of the predetermined positions that has been set with consideration for a stacking direction of the unit cells and a flow channel direction of the reaction gas flow channel, and supplies a gas including hydrogen gas to the reaction gas flow channel and discharges water vapor and nitrogen gas from inside the fuel cell when at least either of the water vapor amount and the nitrogen gas amount exceeds the threshold at at least one of the positions. The case in which the predetermined positions are connected to each other is also included in the concept of "a plurality of predetermined positions".

In accordance with the present invention, when the water vapor amount or nitrogen gas amount at any position inside the electrolyte membrane or reaction gas flow channel exceeds a threshold that has been set for each position, a gas is caused to flow in the reaction gas flow channel and therefore excess water vapor or nitrogen gas can be reliably prevented from remaining inside the fuel cell during the operation stop of intermittent operation. As a result, the insufficient reaction gas supply and drop of cell voltage caused by the water vapor or nitrogen gas can be inhibited when the next operation cycle is started and fuel consumption can be improved. Further, since the threshold is set with consideration for the stacking direction of unit cells and flow channel direction of the reaction gas flow channel, the frequency or timing of gas supply cycles can be optimized. As a result, the amount of water vapor or nitrogen gas can be efficiently reduced and extra supply of gas can be inhibited.

The reaction gas flow channel may communicate with a circulation flow channel that treats the gas discharged from the fuel cell and supplies the treated gas to the fuel cell; and the operation control unit may perform gas circulation in the circulation flow channel when the threshold is exceeded. In such a case, water vapor and nitrogen gas can be advantageously discharged from the fuel cell.

A discharge flow channel leading to the outside of the fuel cell system may be connected via an opening-closing valve to the circulation flow channel; and the operation control unit may open the opening-closing valve during gas circulation and perform via the discharge flow channel the discharge of water vapor and nitrogen gas. In such a case, water vapor and nitrogen gas can be effectively discharged.

The estimation unit may estimate, as estimation of the water vapor amount, a residual water amount distribution in the reaction gas flow channel and a water content distribution in the electrolyte membrane in a cell plane of each of the unit cells with consideration for water transfer performed between the anode electrode and the cathode electrode via the electrolyte membrane, and estimate, as estimation of the nitrogen gas amount, a nitrogen gas distribution in the reaction gas flow channel in the cell plane of each of the unit cells with consideration for nitrogen gas transfer performed between the anode electrode and the cathode electrode via the electrolyte membrane. In such a case, water transfer between the electrodes is taken into account and therefore a high estimation accuracy of water content and residual water amount, that is, water vapor amount, can be ensured. Since nitrogen gas transfer between the electrodes is taken into account, a high estimation accuracy of nitrogen gas amount can be ensured. In addition, since gas is caused to flow by using the results of such high estimation accuracy, the timing and frequency thereof can be optimized. As a consequence, water vapor and nitrogen gas can be appropriately discharged.

Another aspect of the present invention resides in an operation method for a fuel cell system including a fuel cell having a cell stack formed by stacking a plurality of unit cells each having an anode electrode, a cathode electrode, an electrolyte membrane located between the anode electrode and the cathode electrode, and a reaction gas flow channel, the operation method comprising: a step of estimating a water vapor amount and a nitrogen gas amount at a plurality of predetermined positions inside at least one of the electrolyte membrane and the reaction gas flow channel; and a step of comparing, during an operation stop of intermittent operation, at least either of the water vapor amount or the nitrogen gas amount at each of the predetermined positions that has been estimated by the estimation unit with a threshold for each of the predetermined positions that has been set with consideration for a stacking direction of the unit cells and a flow channel direction of the reaction gas flow channel, and supplying a gas including hydrogen gas to the reaction gas flow channel and discharging water vapor and nitrogen gas from inside the fuel cell when at least either of the water vapor amount and the nitrogen gas amount exceeds the threshold at at least one of the positions.

In accordance with the present invention, when the water vapor amount or nitrogen gas amount at any position inside the electrolyte membrane or reaction gas flow channel of the fuel cell exceeds a threshold that has been set for each position, the gas flows in the reaction gas flow channel and therefore excess water vapor or nitrogen gas can be reliably prevented from remaining inside the fuel cell during the operation stop of intermittent operation. As a result, the insufficient reaction gas supply and drop of cell voltage caused by water vapor or nitrogen gas can be inhibited when the next operation cycle is started and fuel consumption can be improved. Further, since the threshold is set with consideration for the stacking direction of unit cells and flow channel direction of the reaction gas flow channel, the frequency or timing of gas supply cycles can be optimized. As a result, the amount of water vapor or nitrogen gas can be efficiently reduced and extra supply of gas can be inhibited.

Gas circulation may be performed in which the gas discharged from the reaction gas flow channel of the fuel cell is treated and supplied to the reaction gas flow channel of the fuel cell when the threshold is exceeded. In such a case, water vapor and nitrogen gas can be advantageously discharged from the fuel cell.

During the gas circulation, water vapor and nitrogen gas may be discharged via a discharge flow channel connected to a circulation flow channel in which the gas circulation is performed. In such a case, water vapor and nitrogen gas can be effectively discharged.

The step of estimating the water vapor amount and nitrogen gas amount may include estimating, as estimation of the water vapor amount, a residual water amount distribution in the reaction gas flow channel and a water content distribution in the electrolyte membrane in a cell plane of each of the unit cells with consideration for water transfer performed between the anode electrode and the cathode electrode via the electrolyte membrane, and estimating, as estimation of the nitrogen gas amount, a nitrogen gas distribution in the reaction gas flow channel in the cell plane of each of the unit cells with consideration for nitrogen gas transfer performed between the anode electrode and the cathode electrode via the electrolyte membrane. In such a case, water transfer between the electrodes is taken into account and therefore a high estimation accuracy of water content and residual water amount, that is, water vapor amount, can be ensured. Since nitrogen gas transfer between the electrodes is taken into account, a high estimation accuracy of nitrogen gas amount can be ensured. In addition, since gas is caused to flow by using the results of such high estimation accuracy, the timing and frequency thereof can be optimized. As a consequence, water vapor and nitrogen gas can be appropriately discharged.

DETAILED DESCRIPTION

The preferred embodiment of the present invention will be explained below with reference to the appended drawings. First, the fuel cell system including the fuel cell according to the present embodiment will be overviewed and then the estimation of water vapor amount and nitrogen gas amount in the fuel cell and an example of control using such estimations will be explained. In the explanation below, hydrogen gas is considered as a fuel gas, air is considered as an oxidizing gas, and the fuel gas and oxidizing gas are called together a reaction gas.

A. Overview of Fuel Cell

Figure 1:
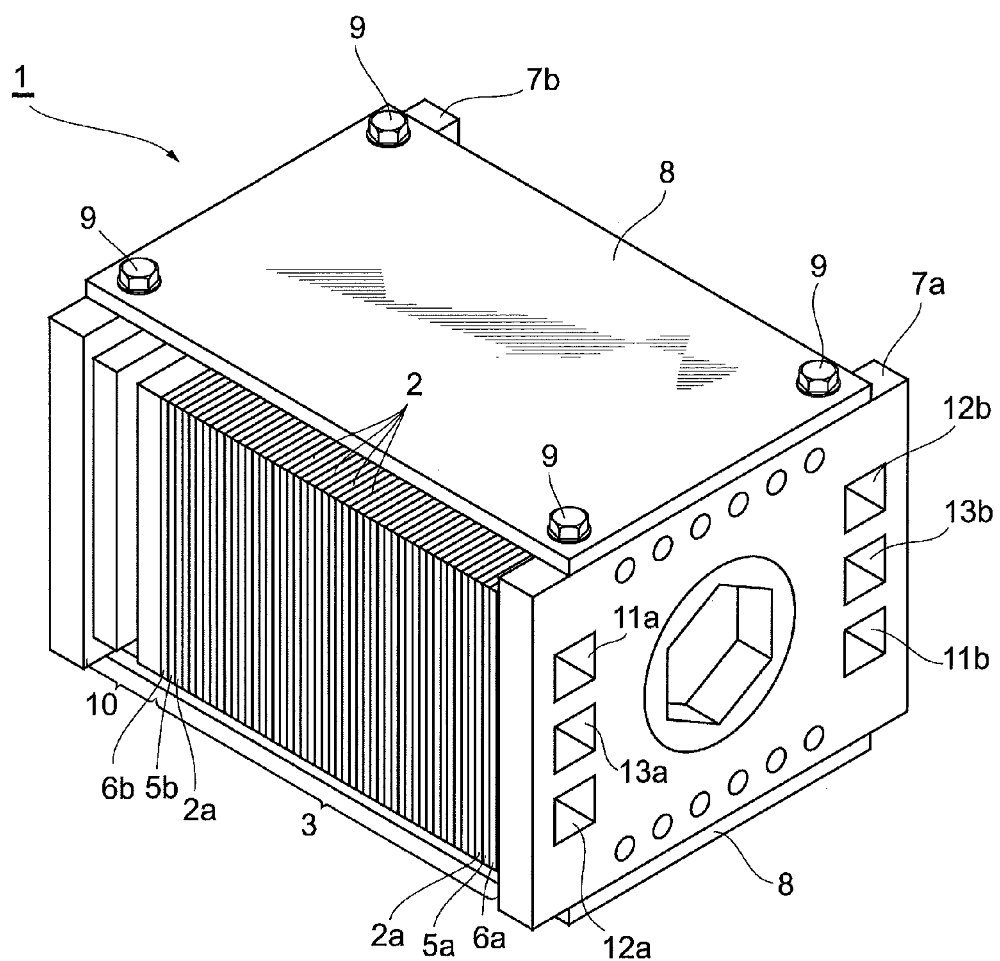
FIG. 1 is a perspective view of the fuel cell according to an embodiment.
Figure 2:
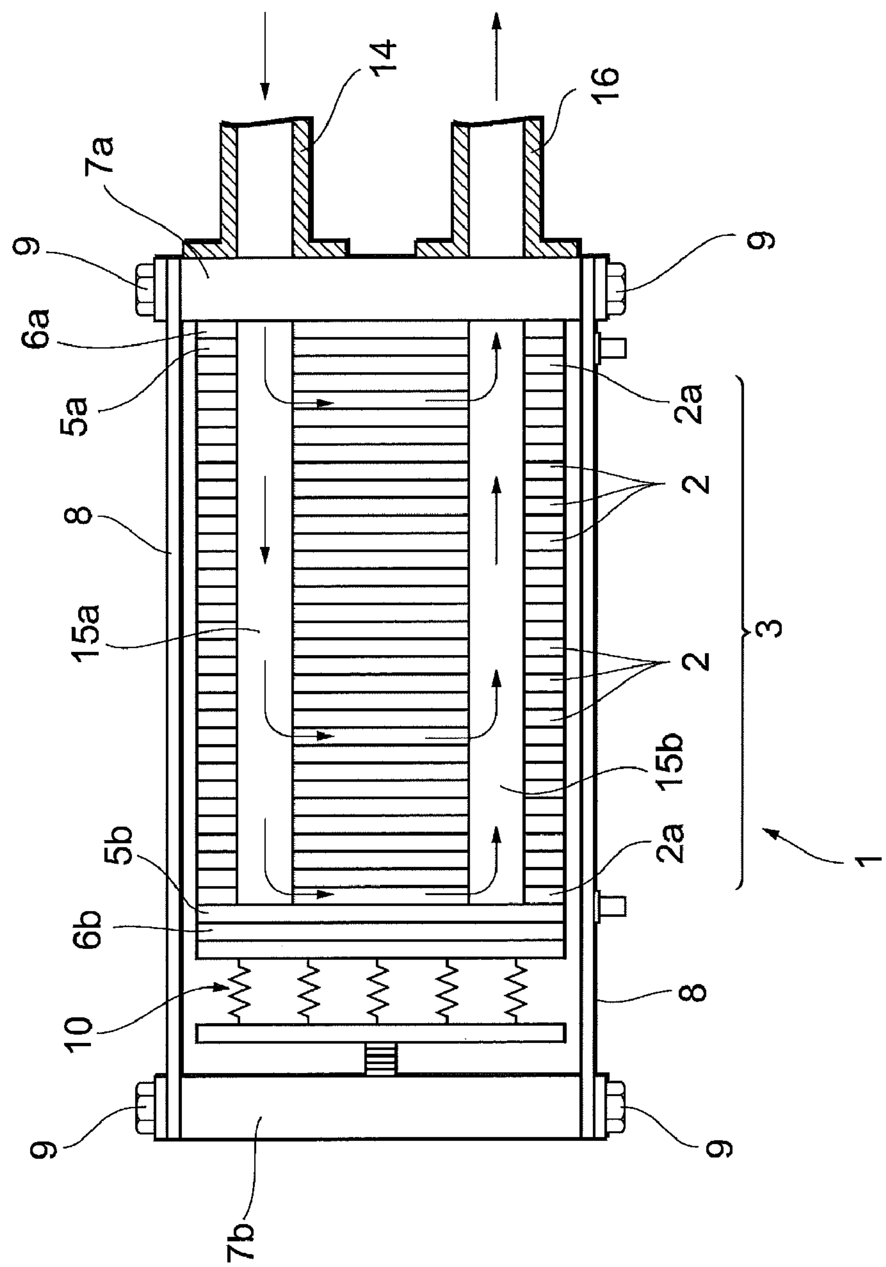
FIG. 2 is a side view illustrating part of the internal structure of the fuel cell according to the embodiment.

As shown in FIG. 1 and FIG. 2, a fuel cell 1 of a stack structure has a cell stack 3 obtained by stacking a plurality of unit cells 2 of a solid polymer electrolyte type. Respective collector plates 5a, 5b, insulating plates 6a, 6b, and end plates 7a, 7b are disposed on the outer side of unit cells 2 (referred to hereinbelow as "end cells 2a") located at both ends of the cell stack 3. Tension plates 8, 8 are fixed by bolts 9 to span between the end plates 7a, 7b, and an elastic module 10 is provided between the end plate 7b and the insulating plate 6b.

Hydrogen gas, air, and coolant are supplied from a supply pipe 14 connected to supply ports 11a, 12a, 13a of the end plate 7a to a manifold 15a located inside the cell stack 3. Then, the hydrogen gas, air, and coolant flow in the plane direction of the unit cells 2, reach a manifold 15b located inside the cell stack 3, and are discharged to the outside of the fuel cell 1 from a discharge pipe 16 connected to discharge port 11b, 12b, 13b of the end plate 7a. The supply pipe 14, manifolds 15a, 15b, and discharge pipe 16 are provided for each fluid of the hydrogen gas, air, and coolant, but in FIG. 2 these components are assigned with same reference numerals and explanation thereof is omitted.

Figure 3:
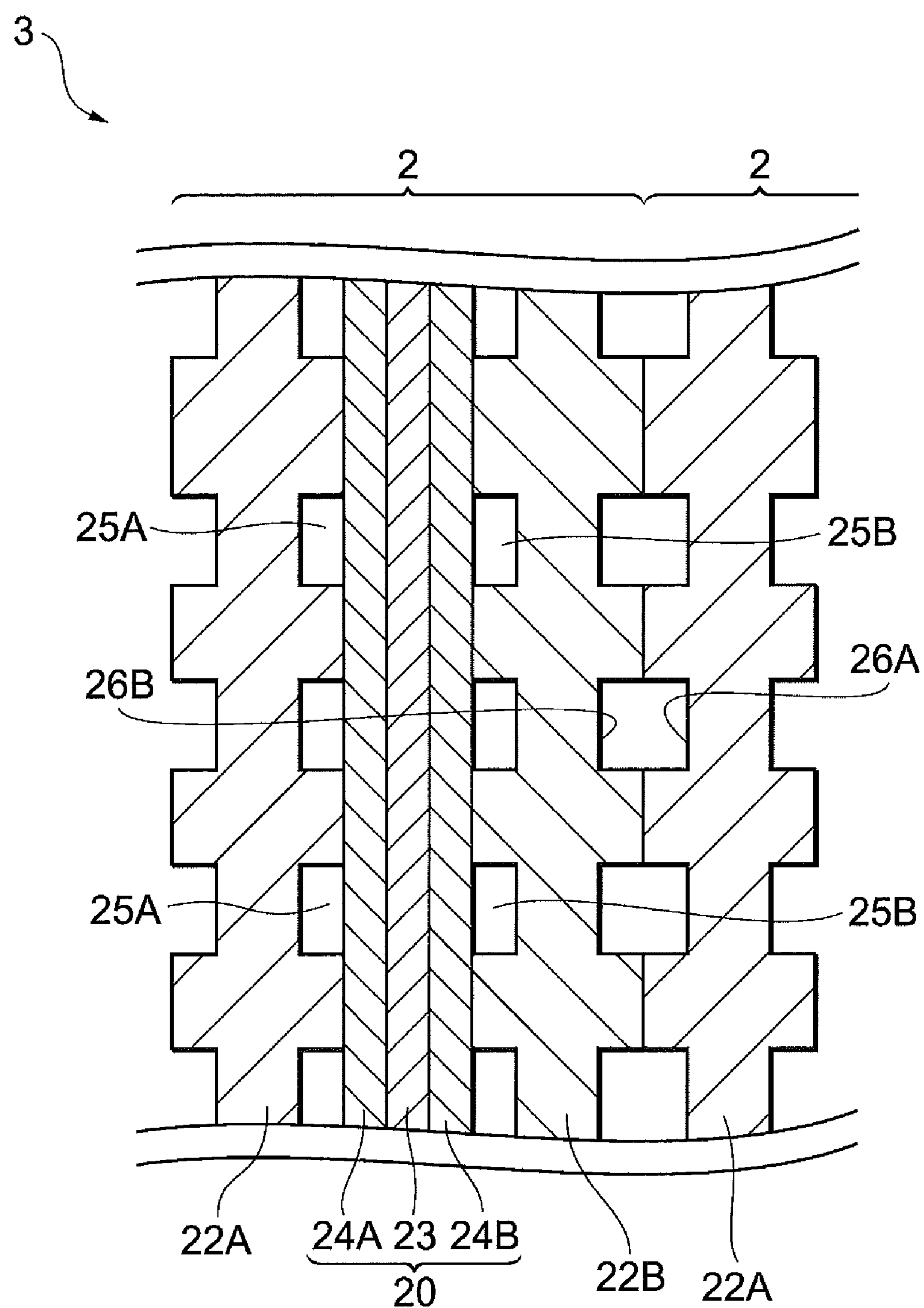
FIG. 3 is a cross-sectional view of the unit cell according to the embodiment.

As shown in FIG. 3, the unit cell 2 is provided with a MEA 20 and a pair of separators 22A, 22B. The MEA 20 (membrane electrode assembly) is constituted by an electrolyte membrane 23 composed of an ion exchange membrane and an anode electrode 24A and a cathode electrode 24B sandwiching the electrolyte membrane 23. A hydrogen flow channel 25A of the separator 22A faces the electrode 24A, and an air flow channel 25B of the separator 22B faces the electrode 24B. Coolant flow channels 26A, 26B of the separators 22A, 22B communicate between the adjacent unit cells 2, 2.

Figure 4:
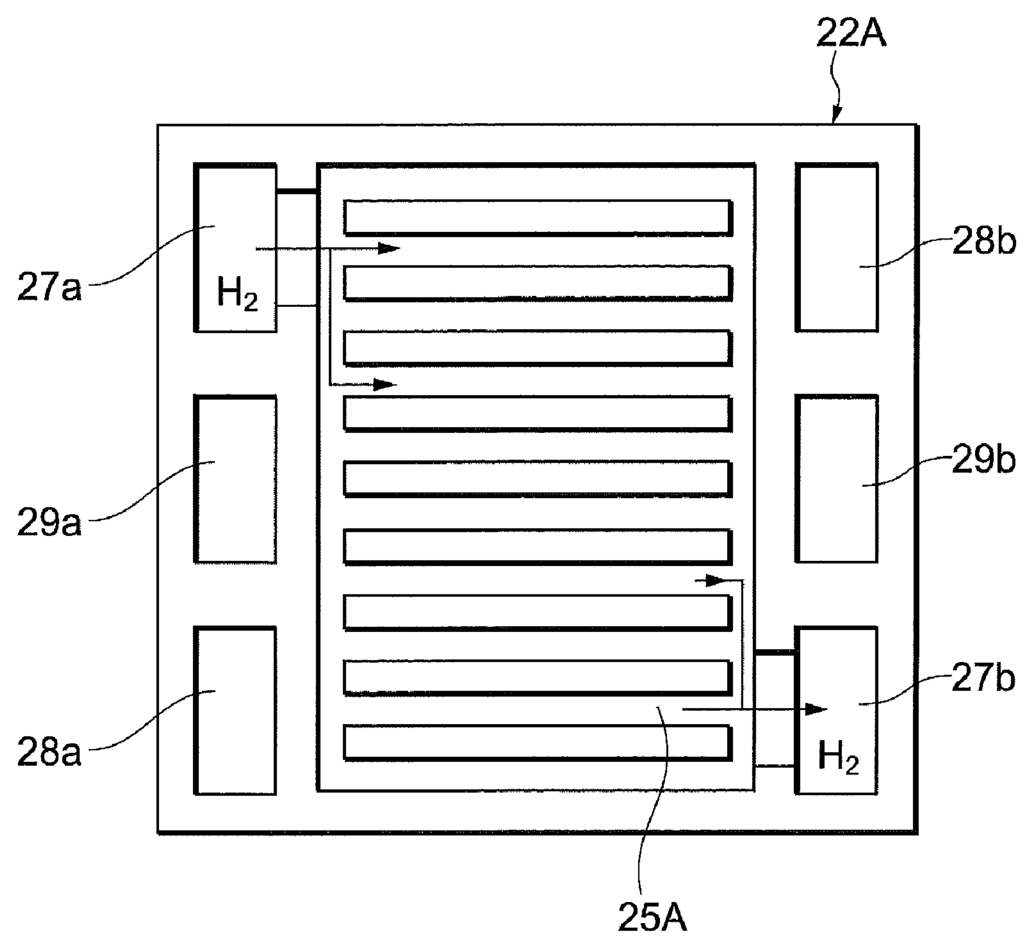
FIG. 4 is a plan view of the separator according to the embodiment.

FIG. 4 is a plan view of the separator 22A. The separator 22A has a hydrogen inlet port 27a, an air inlet port 28a, a coolant inlet port 29a, a hydrogen outlet port 27b, an air outlet port 28b, and a coolant outlet port 29b that are formed as through ports on the outside of the hydrogen flow channel 25A. The inlet ports 27a, 28a, 29a constitute parts of the manifold 15a corresponding to the respective fluid. Likewise, outlet ports 27b, 28b, 29b constitute parts of the manifold 15b corresponding to the respective fluid.

In the separator 22A, the hydrogen gas is introduced from the inlet port 27a into the hydrogen flow channel 25A and discharged toward the outlet port 27b. In this respect, the coolant flows in a similar manner. In the separator 22B configured similarly to the separator 22A, the air flows in the plane direction thereof (this configuration will not be described in detail hereinbelow). Thus, hydrogen gas and air are supplied to the electrodes 24A, 24B located inside the unit cell 2, an electrochemical reaction is induced by the hydrogen gas and air inside the MEA 20, and an electromotive force is obtained. Due to the electrochemical reaction, heat is generated and water is produced at the electrode 24B side. The amount of heat in each unit cell 2 is reduced by the flow of coolant. Further, nitrogen gas is also generated from the air at the electrode 24B side.

Figure 5A:
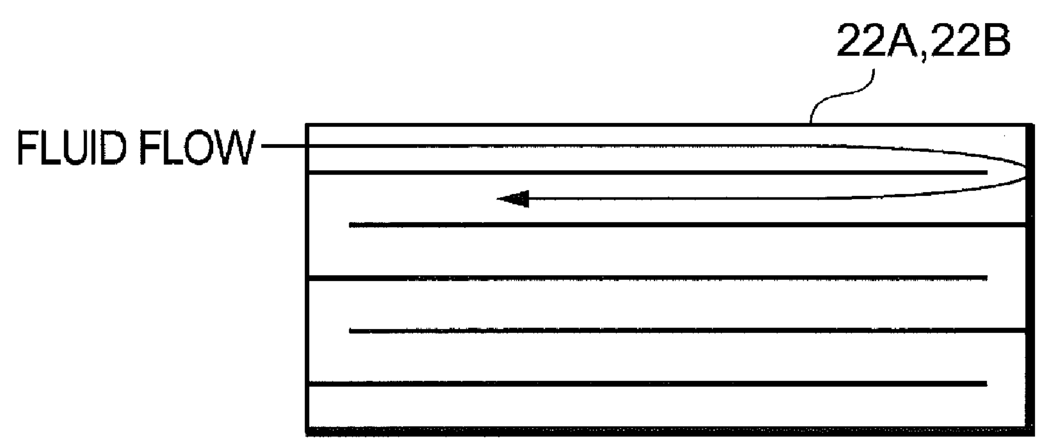
FIG. 5A is a schematic plan view of the flow channel shape of the separator according to the first variation example of the embodiment.
Figure 5B:
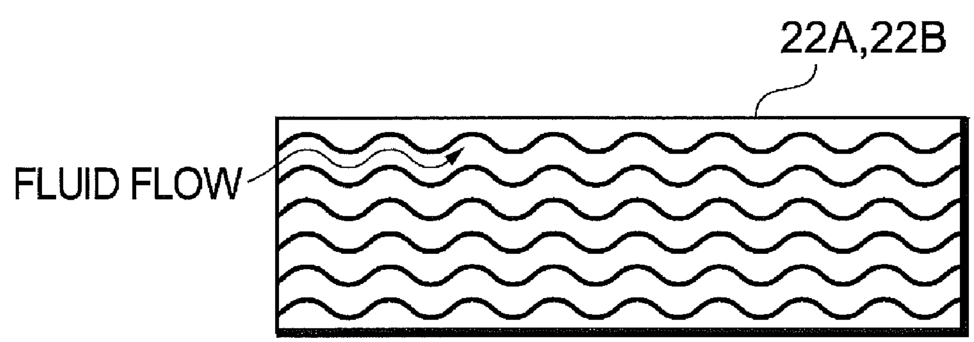
FIG. 5B is a schematic plan view of the flow channel shape of the separator according to the second variation example of the embodiment.
Figure 5C:
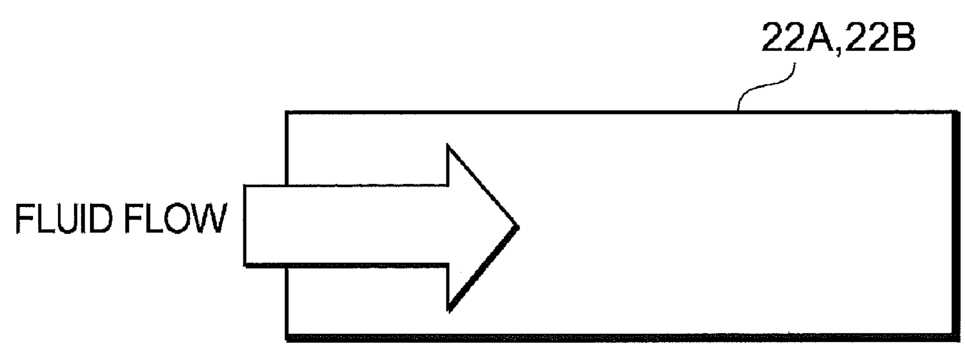
FIG. 5C is a schematic plan view of the flow channel shape of the separator according to the third variation example of the embodiment.

FIGS. 5A to 5C are schematic plan views illustrating other flow channel shapes of the separator that can use the present embodiment. Thus, instead of the configuration with linear groove flow channels (peaks and valleys repeatedly extend in one direction) shown in FIG. 4, the flow channels 25A, 25B, 26A, 26B can have a serpentine flow channel shape in which folded sections are present in the intermediate portions as shown in FIG. 5A. Further, the flow channels 25A, 25B, 26A, 26B can have a wavy shape, as shown in FIG. 5B, or a flat shape without peaks or valleys, as shown in FIG. 5C. As for the reaction gas flow mode, a counter-flow type in which the hydrogen gas and air flow in the opposite directions can be used instead of the co-flow type (the hydrogen gas and air flow in the same direction) such as illustrated by FIG. 1 and FIG. 4. Further, the separators 22A, 22B may be oriented vertically or transversely. In other words, the below-described estimation of moisture amount in the fuel cell 1 is not limited to the hardware configuration of the fuel cell 1.

B. Overview of Fuel Cell System

Figure 6:
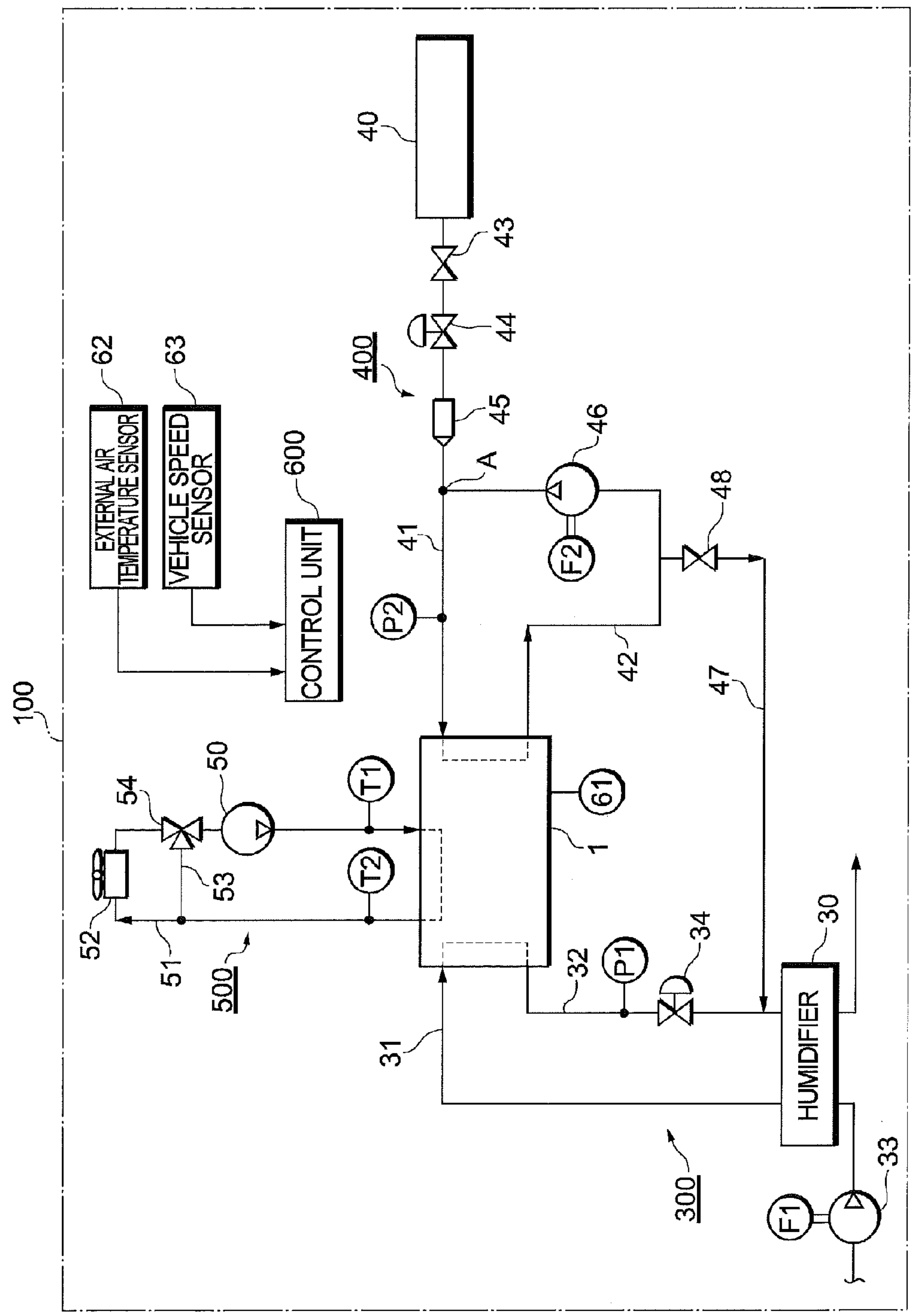
FIG. 6 is a configuration diagram of the fuel cell system according to the embodiment.

As shown in FIG. 6, a fuel cell system 100 is provided with an air pipe system 300, a hydrogen pipe system 400, a coolant pipe system 500, and a control unit 600. The fuel cell system 100 can be installed at a variety of mobile bodies, such as vehicle, ships, aircrafts, and robots and can also be applied to stationary power sources. The fuel cell system 100 installed on an automobile will be explained below by way of example.

The air pipe system 300 supplies the air to the fuel cell 1 and discharges the air therefrom. The air pipe system has a humidifier 30, a supply flow channel 31, a discharge flow channel 32, and a compressor 33. The air contained in the atmosphere (low-humidity air) is taken in by the compressor 33, pumped into the humidifier 30, and subjected to moisture exchange with the oxidation off-gas in a high-humidity state in the humidifier 30. As a result, the appropriately humidified air is supplied from the supply flow channel 31 to the fuel cell 1. A back pressure valve 34 that adjusts the air back pressure of the fuel cell 1 is provided in the discharge flow channel 32. A pressure sensor P1 that detects the air back pressure is provided in the vicinity of the back pressure valve 34. A fuel rate sensor F1 that detects the flow rate of air supply to the fuel cell 1 is provided in the compressor 33.

The hydrogen pipe system 400 supplies hydrogen gas to the fuel cell 1 and discharges the hydrogen gas therefrom. The hydrogen pipe system has a hydrogen supply source 40, a supply flow channel 41, a circulation flow channel 42, and a shut valve 43. Hydrogen gas from the hydrogen supply source 40 is depressurized by a regulator 44, and the flow rate and pressure thereof are adjusted with high accuracy by an injector 45. Then, the hydrogen gas merges in a merging point A with hydrogen off-gas pumped by a hydrogen pump 46 located on the circulation channel 42 and the merged gases are supplied to the fuel cell 1. A discharge flow channel 47 provided with a discharge-gas-water valve 48 serving as an opening-closing valve is branched and connected to the circulation flow channel 42, and when the discharge-gas-water valve 48 is opened, the hydrogen off-gas is discharged to the discharge flow channel 32. A pressure sensor P2 that detects a supply pressure of hydrogen gas to the fuel cell 1 is provided downstream of the merging point A. Further, a flow rate sensor F2 is provided at the hydrogen pump 46. In another embodiment, the fuel off-gas may be introduced in a hydrogen diluting device and a gas-liquid separator may be provided in the circulation flow channel 42.

The coolant pipe system 500 supplies in a circulation manner a coolant (for example, cooling water) to the fuel cell 1. The coolant pipe system has a cooling pump 50, a coolant flow channel 51, a radiator 52, a bypass flow channel 53, and a switching valve 54. The cooling pump 50 pumps the coolant located inside the coolant flow channel 51 into the fuel cell 1. The coolant flow channel 51 has a temperature sensor T1 located at a coolant inlet port side of the fuel cell 1 and a temperature sensor T2 located at a coolant outlet side of the fuel cell 1. The radiator 52 cools the coolant discharged from the fuel cell 1. The switching valve 54 is constituted, for example, by a rotary valve and switches the coolant passage between the radiator 52 and the bypass flow channel 53 as necessary.

The control unit 600 is constituted by a microcomputer having a CPU, a ROM, and a RAM inside thereof. Detection information of the sensors (P1, P2, F1, F2, T1, T2) detecting pressure, temperature, and flow rate of fluid flowing in the pipe systems 300, 400, 500 is inputted to the control unit 600. Detection information of a current sensor 61 detecting the current value generated by the fuel cell 1 and also detection information of an external air temperature sensor 62, a vehicle speed sensor 63, and accelerator depression amount sensor is also inputted to the control unit 600. The control unit 600 controls the devices (compressor 33, shut valve 43, injector 45, hydrogen pump 46, discharge-gas-water valve 48, cooling pump 50, switching valve 54, etc.) located inside the system 100 according to the detection information of the aforementioned types and performs integrated control of the operation of the fuel cell system 100. The control unit 600 also reads the detection information of various types, estimates the water vapor amount or nitrogen gas amount in the fuel cell 1 by using various maps stored in the ROM, and induces gas circulation in the circulation flow channel 42 on the basis of the estimation results.

Figure 7:
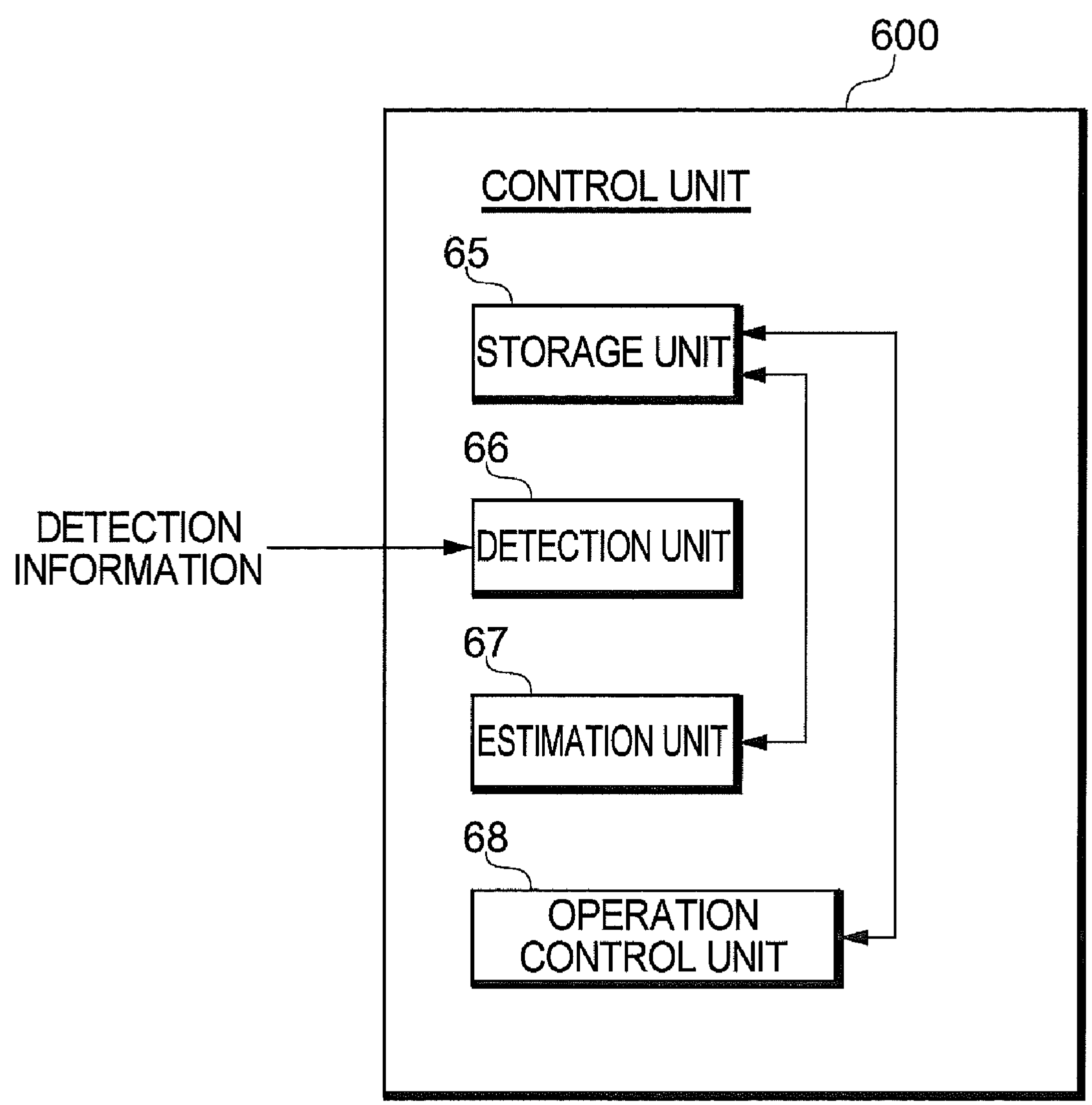
FIG. 7 is a functional block diagram of the control unit according to the embodiment.

As shown in FIG. 7, the control unit 600 is provided with a storage unit 65, a detection unit 66, an estimation unit 67, and an operation control unit 68 as functional blocks for estimating the water vapor amount or nitrogen gas amount in the fuel cell 1 and implementing the control on the basis of the estimation results. The storage unit 65 stores various programs or various maps for realizing the estimation of the water vapor amount or nitrogen gas amount in the fuel cell 1 and the control. The maps are obtained in advance by tests or simulation. The detection unit 66 reads the detection information of various sensors (P1, P2, F1, F2, T1, T2, 61 to 63). The operation control unit 68 sends control commands to various devices on the basis of the estimation results obtained by the estimation unit 67 and performs operation control such that the fuel cell 1 assumes the desired operation state (for example, water vapor state, nitrogen gas state, temperature state, etc.). In this case, the operation control unit 68 executes the control divided between the anode side and the cathode side as necessary.

The estimation unit 67 estimates the water vapor amount or nitrogen gas amount at a plurality of predetermined positions inside the electrolyte membrane 23 of the fuel cell 1 and inside the reaction gas flow channel with reference to the maps located in the storage unit 65 on the basis of information acquired by the detection unit 66. More specifically, the estimation unit 67 estimates the residual water amount distribution and water content distribution in the cell plane of the unit cell 2 by taking into account the movement of water performed between the electrodes 24A, 24B via the electrolyte membrane 23 as the estimation of the water vapor amount. Further, the estimation unit 67 also estimates the residual nitrogen gas amount distribution and nitrogen gas content distribution in the cell plane of the unit cell 2 by taking into account the movement of nitrogen gas performed between the electrodes 24A, 24B via the electrolyte membrane 23 as the estimation of the amount of nitrogen gas. The estimation unit 67 also estimates the residual water amount distribution, water content distribution, and nitrogen gas amount distribution in the stacking direction of the unit cells 2 (referred to hereinbelow as cell stacking direction).

The expression "in the cell plane" herein means the inside of the unit cell 2 in the plane direction (direction parallel to the sheet surface in FIG. 4, this direction being perpendicular to the cell stacking direction) of the unit cell 2. The "residual water amount" as referred to herein means the water vapor amount present inside the reaction gas flow channel of the unit cell 2. The reaction gas flow channel is a general name for the hydrogen flow channel 25A and the air flow channel 25B. The "water content" as referred to herein means the water vapor amount contained in the electrolyte membrane 23 of the unit cell 2. The "nitrogen gas amount" as referred to herein means the amount of nitrogen gas present inside the reaction gas flow channel of the unit cell 2.

C. Method for Estimating the Water Vapor Amount in Fuel Cell

In the method of estimating the water vapor amount according to the present embodiment, the residual water amount and the water content are estimated separately and, in this process, the residual water amount distribution is estimated separately for the anode side and cathode side. Further, with respect to the residual water amount and water content, not only the distribution in the cell plane, but also the distribution in the cell stacking direction is estimated. First, the method of estimating the water vapor distribution (residual water amount distribution and water content distribution) in the cell plane will be described below. Subsequent explanation clarifies how to take the spread in temperature and spread in flow distribution in the cell stacking direction into account when performing the estimation and then the method of estimating the water vapor distribution in the cell stacking direction is described.

1. Method of Estimating Water Vapor Distribution in the Cell Plane

Figure 8:
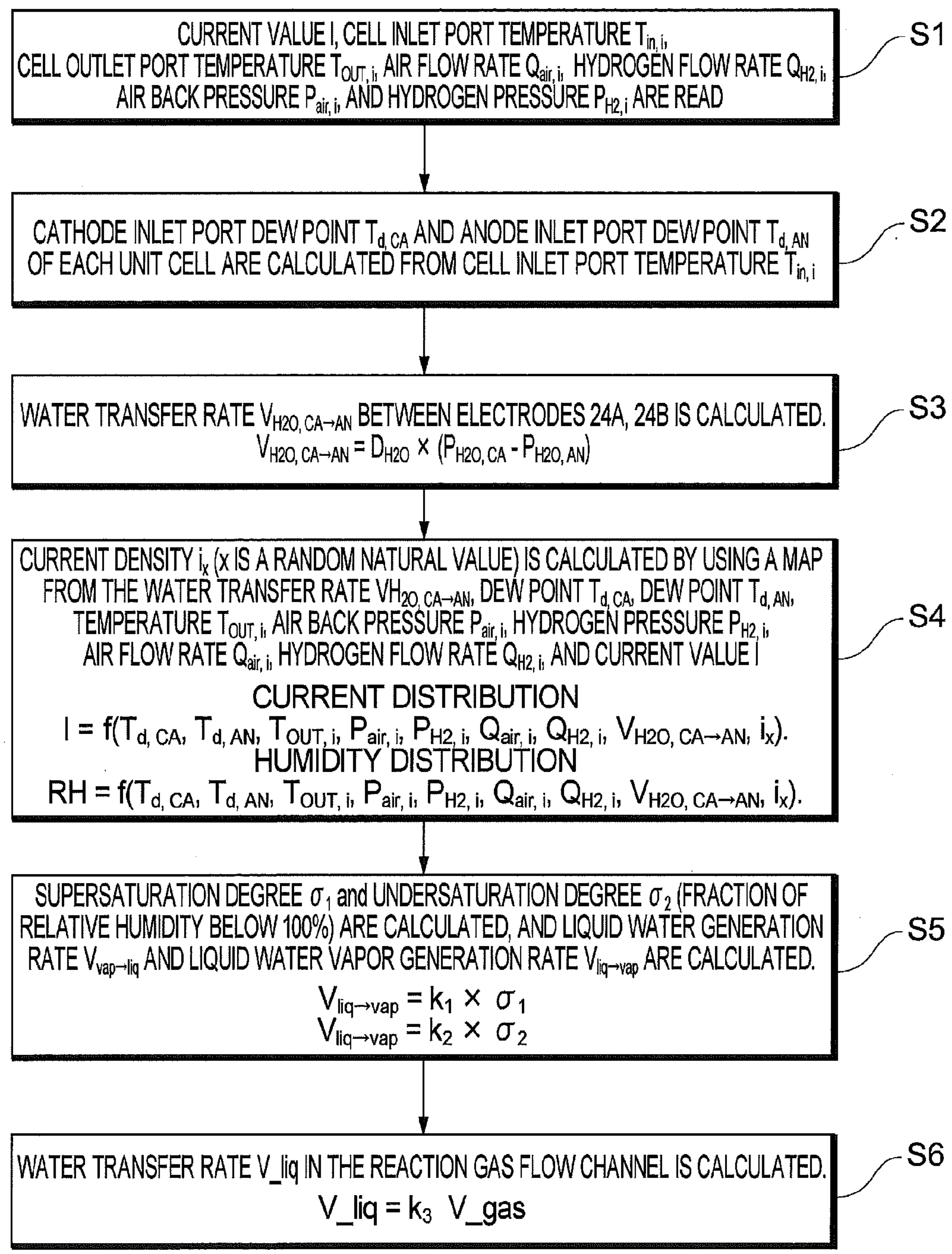
FIG. 8 is a flowchart illustrating the method of estimating the water vapor distribution in the cell plane according to the embodiment.

As shown in FIG. 8, first, a current value I, a cell inlet port temperature $T_{in,i}$, a cell outlet port temperature $T_{OUT,i}$, an air flow rate $Q_{air,i}$, a hydrogen flow rate $Q_{H2,i}$, an air back pressure $P_{air,i}$, and a hydrogen pressure $P_{H2,i}$ are read (step S1).

Figure 9:
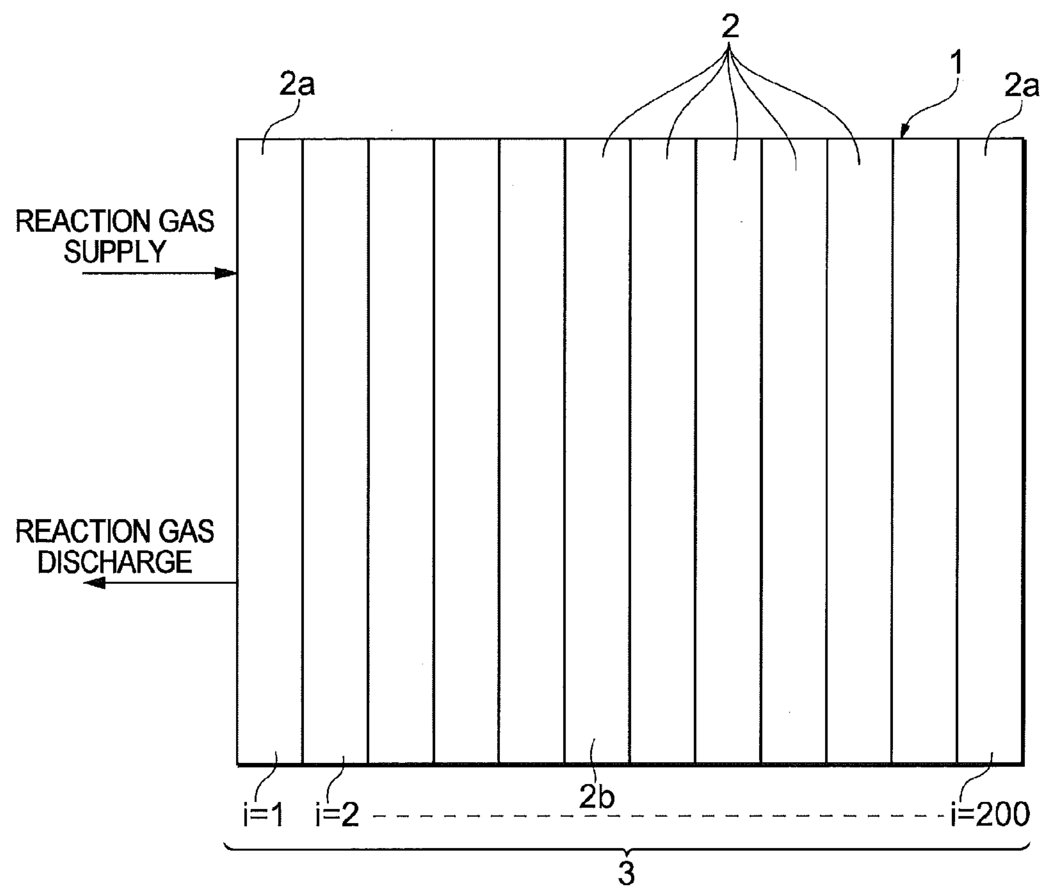
FIG. 9 illustrates the relationship between the supply and discharge of reaction gas for the cell stack according to the embodiment.

Here, the current value I is the value detected by the current sensor 61. The subscript index "i" in the cell inlet port temperature $T_{in,i}$, etc., means a cell channel indicating the position of the unit cell 2 in the cell stack 3. More specifically, when the cell stack 3 shown in FIG. 9 is taken as a model, the cell channel "i" of the end cells 2*a* closest to the supply port (corresponds to the supply ports 11*a*, 12*a* in FIG. 1) and the discharge port (corresponds to the discharge ports 11*b*, 12*b* in FIG. 1) of the reaction gas is 1. When a total of 200 unit cells 2 are stacked, the cell channel "i" of another end cell 2*a* is 200.

The cell inlet port temperature $T_{in,i}$ and cell outlet port temperature $T_{OUT,i}$ are respectively the coolant temperature in the coolant inlet port 29*a* and the coolant temperature in the coolant outlet port 29*b* of the unit cell 2 (cell channel: i). The air flow rate $Q_{air,i}$ and hydrogen flow rate $Q_{H2,i}$ are respectively the supply flow rates of air and hydrogen gas flowing into the air inlet port 28*a* and hydrogen inlet port 27*a* of the unit cell $\mathbf{2}_i$. The air back pressure $P_{air,i}$ and hydrogen pressure $P_{H2,i}$ are respectively the pressure of air and hydrogen gas in the air outlet port 28*b* and hydrogen inlet port 27*a* of the unit cell $\mathbf{2}_i$. When the fuel cell has only one unit cell 2 or when the temperature spread and flow distribution spread in the cell stacking direction is not taken into consideration, the following is obtained.

$T_{in,i}$: detection value obtained with the temperature sensor T1

$T_{OUT,i}$: detection value obtained with the temperature sensor T2

$Q_{air,i}$: detection value obtained with the flow rate sensor F1

$Q_{H2,i}$: hydrogen supply flow rate determined from the detection value obtained with the flow rate sensor F2

$P_{air,i}$: detection value obtained with the pressure sensor P1

$P_{H2,i}$: detection value obtained with the pressure sensor P2

Where the fuel cell 1 has a plurality of unit cells 2, heat emission and pressure loss differ depending on the position in the cell stacking direction. As a result, there is a spread in heat emission and a spread in reaction gas and coolant flow distribution among the unit cells 2. Therefore, it is desirable that the cell inlet port temperature $T_{in,i}$ be used that takes this spread into account. This will be explained in detail later.

Values obtained by sensors other than the abovementioned sensors or by calculations can be also used as the detection values used as the cell inlet port temperature $T_{in,i}$. In other words, a temperature sensor, a flow rate sensor, and a pressure sensor may be also provided at positions other than those shown in FIG. 6, and the number and positions thereof can be designed and changed as appropriate. For example, the hydrogen flow rate sensor may be provided close to the hydrogen supply port 11*a* of the fuel cell 1 and the detection value of this hydrogen flow rate sensor may be used as the hydrogen flow rate $Q_{H2,i}$. Further, the cell inlet port temperature $T_{in,i}$ and the cell outlet port temperature $T_{OUT,i}$ can be also estimated by attaching a temperature sensor to the end cell 2*a* or the end plates 7*a*, 7*b*. Thus, the water vapor distribution can be estimated with higher accuracy by measuring the temperature of the fuel cell stack itself instead of the coolant temperature.

In step S2 shown in FIG. 8, a cathode inlet port dew point $T_{d,CA}$ and an anode inlet port dew point $T_{d,AN}$ of each unit cell $\mathbf{2}_i$ are calculated from the cell inlet port temperature $T_{in,i}$. In the present embodiment, since the humidifier 30 is used in the fuel cell system 1, the respective cell inlet temperature $T_{in,i}$ can be used as the cathode inlet port dew point $T_{d,CA}$ and the anode inlet port dew point $T_{d,AN}$. Thus, when the air inlet port 28*a* and the hydrogen inlet port 27*a* are close to the coolant inlet port 29*a*, the temperatures can be represented as shown below and the stacking spread of dew point can be taken into account.

$$T_{d,CA}=T_{d,AN}=T_{in,i}.$$

Further, in step S2, the cathode inlet port dew point $T_{d,CA}$ and the anode inlet port dew point $T_{d,AN}$ of each unit cell 2; may be also calculated from the cell outlet port temperature $T_{out,i}$. Further, in another embodiment, a dew point meter may be used. For example, when no humidifier is used in the fuel cell system 1 or when the cell inlet temperature $T_{in,i}$ is not used, it is possible to dispose respective dew point meters in the stack inlet ports (anode-side supply port 11*a* and cathode-side supply port 12*a*) of the fuel cell 1 and set the detection values of the dew point meters as the cathode inlet port dew point $T_{d,CA}$ and the anode inlet port dew point $T_{d,AN}$. In such a case, a more accurate estimation can be performed.

In an air humidification-free system in which the humidifier 30 is not installed in the air pipe system 300, the cathode inlet port dew point $T_{d,CA}$ can be calculated as 0° C. Alternatively, the cathode inlet port dew point $T_{d,CA}$ can be also calculated as a product of external air temperature and external humidity by using the external temperature and external humidity sensors. In other words, the present estimation method can be also applied to a humidification-free system.

In step S3 shown in FIG. 8, a water transfer rate $V_{H2O,CA\rightarrow AN}$ between the electrodes 24A, 24B is determined. The water transfer rate $V_{H2O,CA\rightarrow AN}$ is calculated by the following formula.

$$V_{H2O,CA\rightarrow AN}=D_{H2O}\times(P_{H2O,CA}-P_{H2O,AN})$$

Here, $P_{H2O,CA}$ is a partial pressure of water vapor on the electrode 24B side of the unit cell $\mathbf{2}_i$ and calculated from the cathode inlet port dew point $T_{d,CA}$. Further, $P_{H2O,AN}$ is a partial pressure of water vapor on the electrode 24A side of the unit cell $\mathbf{2}_i$ and calculated from the anode inlet port dew point $T_{d,AN}$. $D_{H2O}$ is a water diffusion coefficient in the electrolyte membrane 23. A constant value can be used as the $D_{H2O}$, but since this coefficient changes depending on humidity, it is preferred that this dependence be taken into account.

Figure 10:
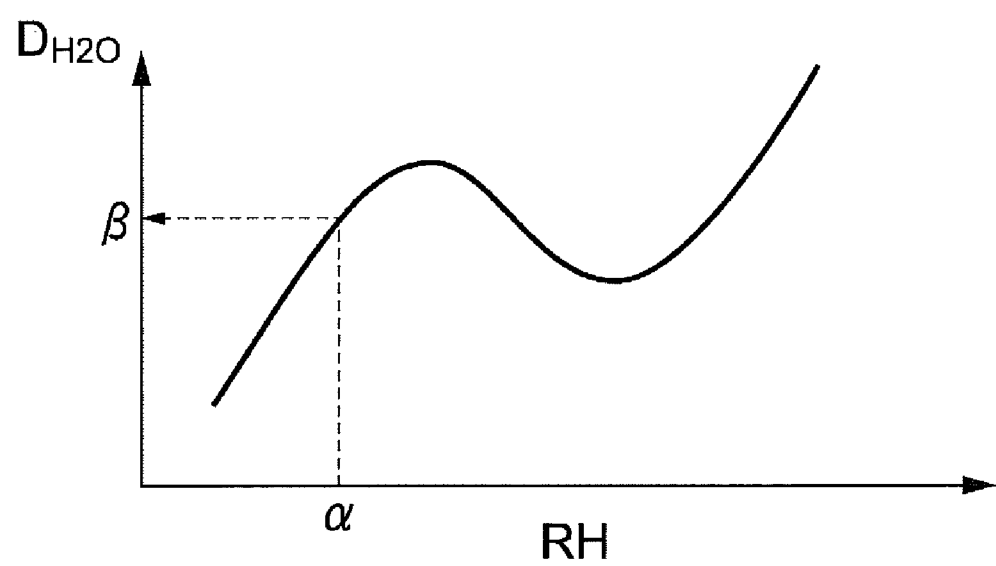
FIG. 10 is a characteristic map illustrating the relationship between the relative humidity of the electrolyte membrane and $D_{H2O}$ according to the embodiment.

When $D_{H2O}$ is determined with consideration for humidity, for example, a characteristic map representing the relationship between $D_{H2O}$ and relative humidity of the electrolyte membrane 23, such as shown in FIG. 10, can be created in advance and the value of $D_{H2O}$ corresponding to the relative humidity of the electrolyte membrane 23 can be used by using the characteristic map. More specifically, the value (β) of $D_{H2O}$ that is used for the present estimation can be determined from the map by using a relative humidity a of the electrolyte membrane 23 estimated during shutdown in the previous operation cycle of the fuel cell system 1, a relative humidity α of the electrolyte membrane 23 estimated in a standby (stop) mode of the fuel cell system 1, and a relative humidity α of the electrolyte membrane 23 estimated immediately prior to the present estimation in the fuel cell system 1.

Figure 11:
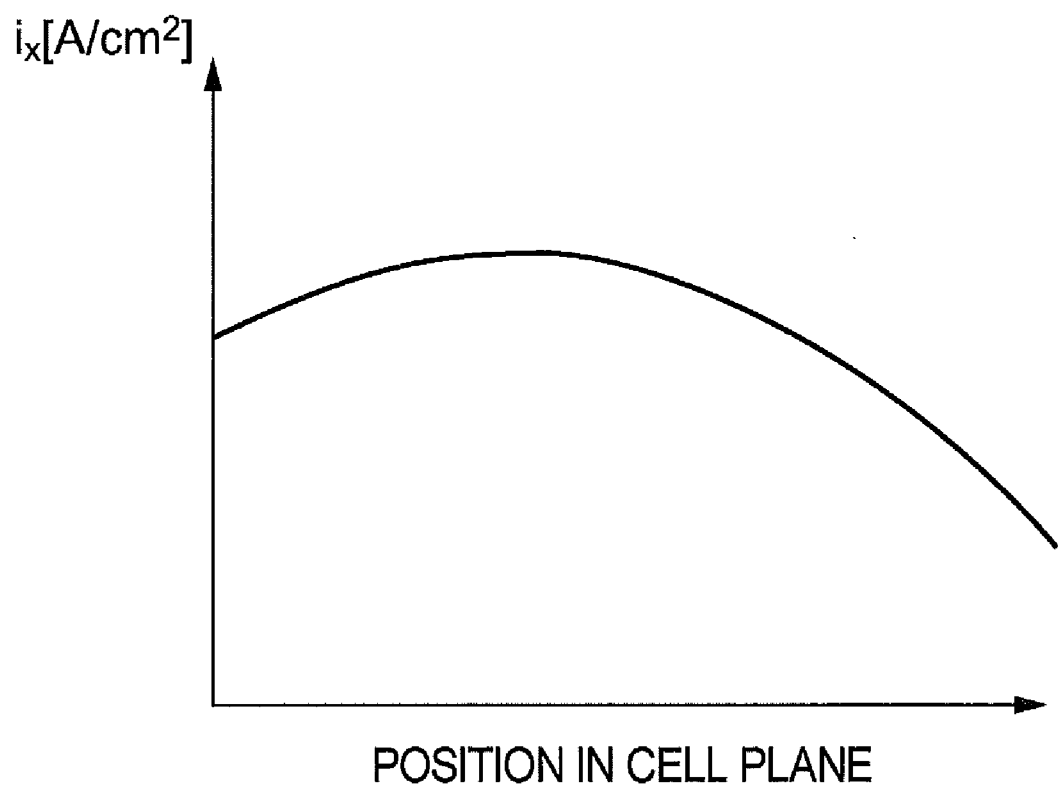
FIG. 11 illustrates the relationship between current density and position in the cell plane according to the embodiment.

In step S4 shown in FIG. 8, a current density $i_x$ (x is a random natural value) is calculated by using a map from the water transfer rate $V_{H2O,\ CA \rightarrow AN}$, dew point $T_{d,\ CA}$, dew point $T_{d,\ AN}$, temperature $T_{OUT,\ i}$, air back pressure $P_{air,\ i}$, hydrogen pressure $P_{H2,\ i}$ air flow rate $Q_{air,\ i}$, hydrogen flow rate $Q_{H2,\ i}$ and current value I. The current density $i_x$ is a current density in any surface area in the cell plane. For example, if each surface area at x=4 is denoted by $s_1$ to $s_4$, then $I=i_1 \times s_1+i_2 \times s_2+i_3 \times s_3+i_4 \times s_4$. An example of results obtained in calculating the distribution of current density $i_x$ is shown in FIG. 11.

Further, in step S4, the current distribution and relative humidity distribution in the cell plane are calculated. The functions I and RH representing these distributions are presented below. The sensitivity of the functions I and RH to respective parameters ($I_{d,\ CA}$, $T_{d,\ AN}$, $T_{OUT,\ i}$, $P_{air,\ i}$, $P_{H2,\ i}$, $Q_{air,\ i}$, $Q_{H2,\ i}$, $V_{H2O,\ CA \rightarrow AN}$, $i_x$) is mapped in advance. Further, the overvoltage distribution in the cell plane may be also calculated from these parameters.

$$I=f(T_{d,CA}, T_{d,AN}, T_{OUT,i}, P_{air,i}, P_{H2,i}, Q_{air,i}, Q_{H2,i}, V_{H2O,CA \rightarrow An}, i_x)$$

$$RH=f(T_{d,CA}, T_{d,AN}, T_{OUT,i}, P_{air,i}, P_{H2,i}, Q_{air,i}, Q_{H2,i}, V_{H2O,CA \rightarrow An}, i_x)$$

Figure 12:
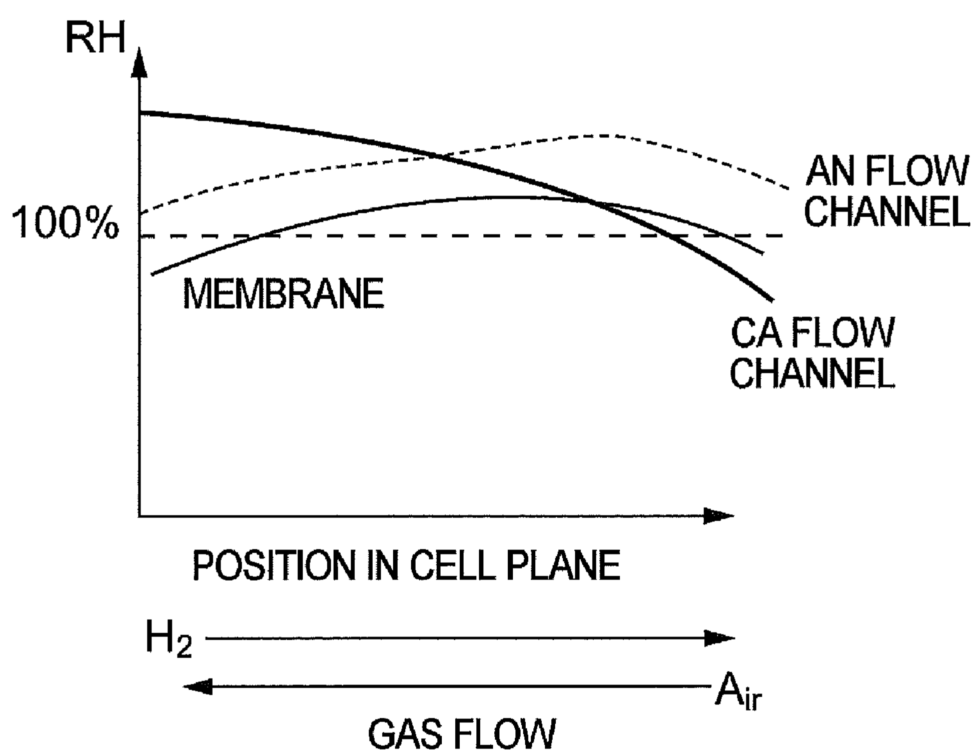
FIG. 12 illustrates the relative humidity distribution in the reaction gas flow channel and electrolyte membrane in the cell plane according to the embodiment.

FIG. 12 shows an example of relative humidity distribution (relative humidity distribution in the reaction gas flow channel and electrolyte membrane) in the cell plane that has been calculated in step S4. In the present embodiment, a flow channel form of a counterflow type is considered by way of example, as shown by the flow of hydrogen gas and air in relation to the position in the cell plane in FIG. 12. As shown in FIG. 12, in the AN flow channel (hydrogen flow channel 25A), the relative humidity exceeds 100% and a supersaturated state is assumed from the hydrogen inlet port 27*a* toward the hydrogen outlet port 27*b*, whereas in the CA flow channel (air flow channel 25B), the relative humidity is less than 100% at the air outlet port 28*b*. Further, the central portion of the electrolyte membrane 23 is in the supersaturated state (central portion of the unit cell 2).

In step S5 shown in FIG. 8, a supersaturation degree $\sigma_1$ (fraction of relative humidity above 100%) and an undersaturation degree $\sigma_2$ (fraction of relative humidity below 100%) are calculated from the results on relative humidity distribution shown in FIG. 12 for the anode side and the cathode side, respectively, and a liquid water generation rate $V_{vap \rightarrow liq}$ and liquid water vapor generation rate $V_{liq \rightarrow vap}$ and are calculated by the equations below. Thus, $V_{vap \rightarrow liq}$ and $V_{liq \rightarrow vap}$ in the hydrogen flow channel 25A and air flow channel 25B are calculated with consideration for the change in water phase (gas phase, liquid phase) in the reaction gas flow channel.

$$V_{vap \rightarrow liq}=k_1 \times \sigma_1$$

$$V_{liq \rightarrow vap}=k_2 \times \sigma_2$$

Here $k_1$, $k_2$ are factors depending on temperature and water repellency and determined by physical properties of the reaction gas flow channel. The coefficients $k_1$, $k_2$ are mapped in advance on the basis of test results.

In step S6 shown in FIG. 8, a water transfer rate V_liq in the reaction gas flow channel is calculated with respect to the anode side and cathode side. Since liquid water is blown off and released from the inside of cell surface by the flow of reaction gas in the reaction gas flow channel, the water transfer rate V_liq of both the hydrogen flow channel 25A and the air flow channel 25B is calculated with consideration for this effect.

$$V\_liq=k_3 \times V\_gas$$

The water transfer rate V_liq as referred to herein is a transfer rate of liquid water blown off by the reaction gas. Further, V_gas as referred to herein is a water vapor flow rate in the reaction gas flow channel, and a value calculated from the map relating to the state parameters such as the supply flow rate of the reaction gas or partial pressure of water vapor is used therefor. The coefficient $k_3$ is a factor depending on temperature and water repellency and determined by physical properties of the reaction gas flow channel. The coefficient $k_3$ is mapped in advance on the basis of test results.

Figure 13:
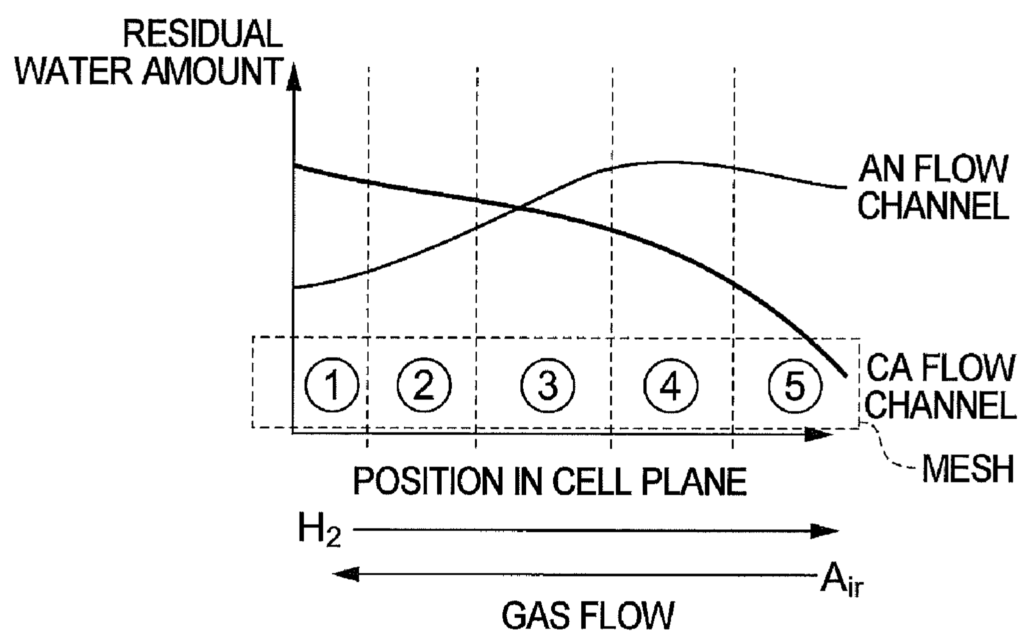
FIG. 13 illustrates the residual water amount distribution in the cell plane according to the embodiment.

FIG. 13 shows an example of residual water amount distribution in the cell plane calculated in steps S4 to S6. The residual water amount distribution is determined by taking the variation in liquid water inside the reaction gas flow channel (that is, the $V_{vap \rightarrow liq}$, $V_{liq \rightarrow vap}$, and V_liq calculated in the abovementioned steps S5 and S6) into account in the relative humidity distribution (FIG. 12) in the reactive gas flow channel calculated in step S4. As follows from FIG. 13, in the hydrogen flow channel 25A, the residual water amount at the hydrogen outlet port 27*b* side is larger than that on the hydrogen inlet port 27*a* side, and the residual water amount decreases gradually in the air flow channel 25B with a transition toward the air outlet port 28*b* side. The water content distribution in the cell plane (not shown in the figure) can be determined from the relative humidity distribution (FIG. 12) of the electrolyte membrane 23 calculated in step S4 and approximates the residual humidity distribution.

With the above-described procedure, the variation amount (water balance) of residual water amount and water content in the unit cell $\mathbf{2}_i$ in a certain computation time interval can be computed and the residual water amount distribution in the hydrogen flow channel 25A, residual water amount distribution in the air flow channel 25B, and water content distribution in the electrolyte membrane 23 can be determined. The water balance can be computed with a coarseness determined by the number of meshes (for example, five meshes shown in FIG. 13) having sensitivity in the cell plane, and which residual water amount and water content (water vapor amount) is realized in which position inside the cell can be estimated with good accuracy.

2. Consideration of Temperature Spread and Flow Distribution Spread in Cell Stacking Direction in Estimation of Water Vapor Distribution $T_{IN,\ i}$, $T_{OUT,\ i}$, $P_{air,\ i}$, $P_{H2,\ i}$, $Q_{air,\ i}$, and $Q_{H2,\ i}$ are determined for each unit cell $\mathbf{2}_i$ in the following manner.

(1) Calculation of Cell Inlet Port Temperature $T_{IN,\ i}$

Figure 14:
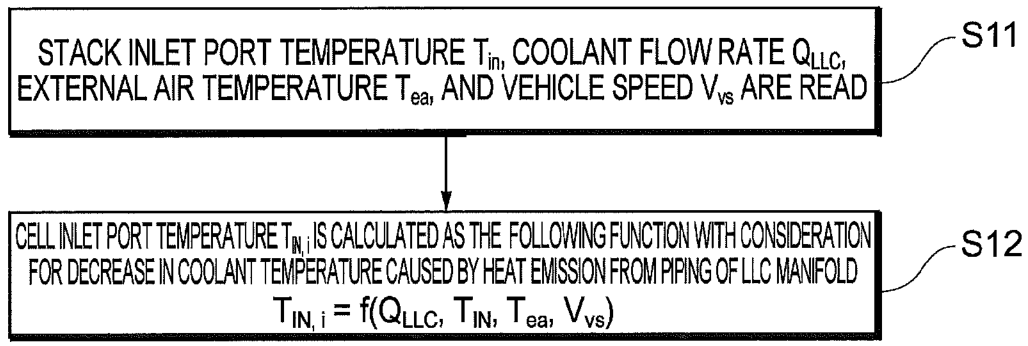
FIG. 14 is a flowchart illustrating a method of calculating the inlet port temperature according to the embodiment.

As shown in FIG. 14, first, the stack inlet port temperature $T_{in}$, coolant flow rate $Q_{LLC}$, external air temperature $T_{ea}$, and vehicle speed $V_{vs}$ are read (step S11). Here, $T_{in}$ is a detection value obtained with the temperature sensor T1. $Q_{LLC}$ is a flow rate of coolant supplied to the fuel cell 1 and can be estimated from the revolution speed of the cooling pump 50 and other detection values. Alternatively, a flow rate sensor may be provided in the coolant flow channel 51 and a detection value obtained with the flow rate sensor may be used. $T_{ea}$ is a detection value obtained with the external air temperature sensor 62, and $V_{vs}$ is a detection value obtained with the vehicle speed sensor 63.

In the cell stack 3, the heat emission amount typically increases with the distance from the reaction gas supply port 14, that is, with the increase in the cell channel number "i".

Figure 15A:
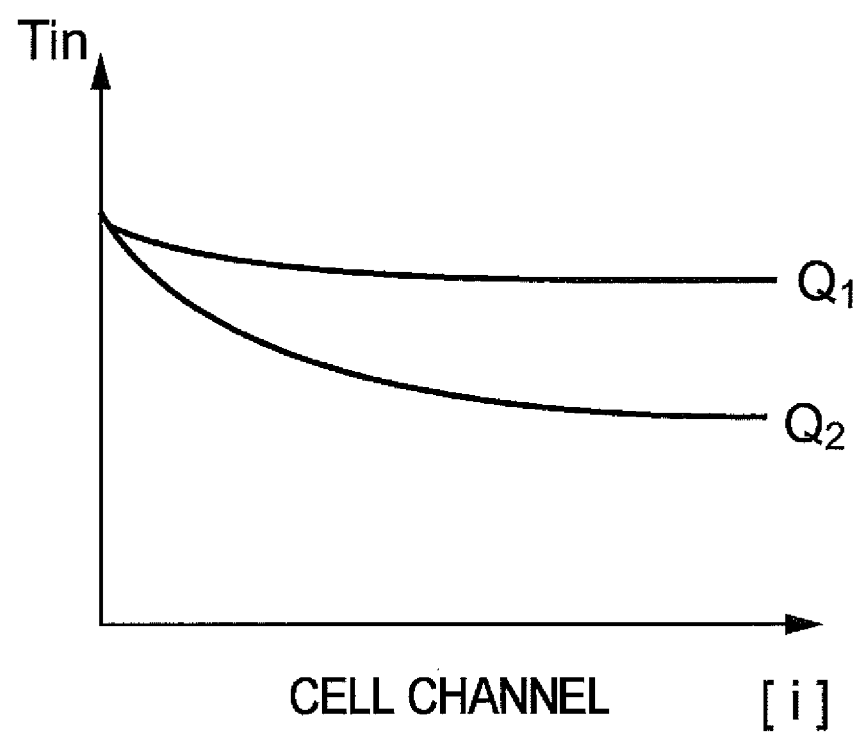
FIG. 15A illustrates the relationship between the unit cell position and the coolant flow rate with respect to the effect of heat emission on the stack inlet port temperature according to the embodiment.
Figure 15B:
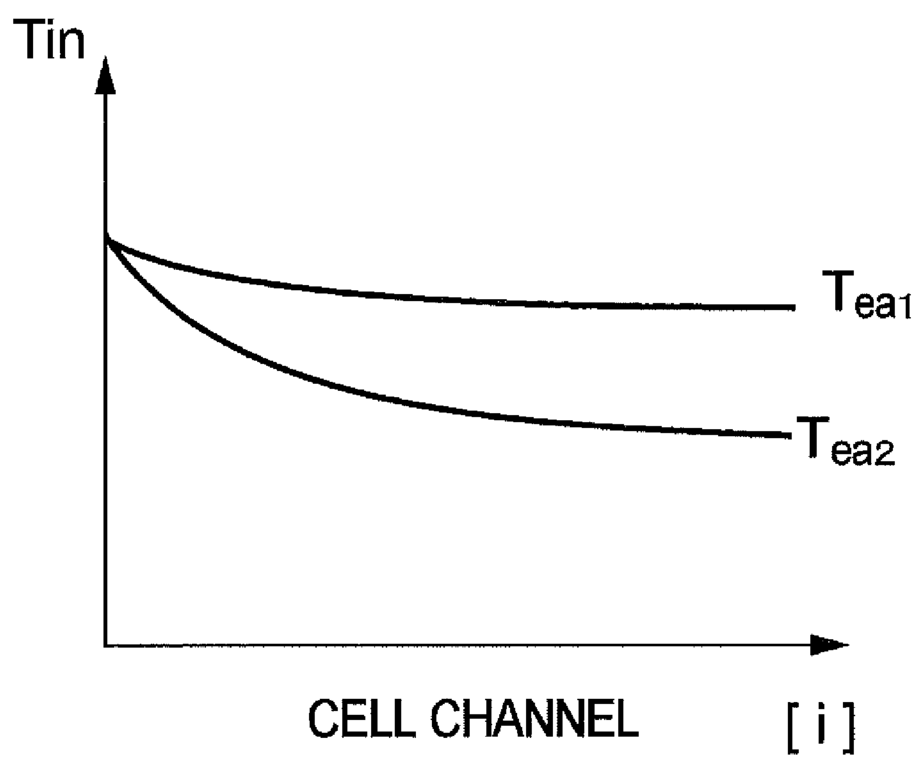
FIG. 15B illustrates the relationship between the unit cell position and the external air temperature with respect to the effect of heat emission on the stack inlet port temperature according to the embodiment.

Further, the effect of heat emission changes depending on the coolant flow rate, external air temperature, and vehicle speed. For example, as shown in FIG. 15A, where the coolant flow rate $Q_{LLC}$ is high ($Q_1>Q_2$), the stack inlet port temperature $T_{IN}$ is not affected by heat emission. In other words, the cell inlet port temperature $T_{IN,\,i}$ does not decrease below the stack inlet port temperature $T_{IN}$. Further, as shown in FIG. 15B, where $T_{ea}$ is high ($T_{ea1}>T_{ea2}$), the stack inlet port temperature $T_{IN}$ is not affected by heat emission.

Accordingly, the cell inlet port temperature $T_{IN,\,i}$ is calculated as the following function with consideration for such a decrease in coolant temperature caused by heat emission (step S12).

$$T_{IN,i}=f(Q_{LLC},T_{IN},T_{ea},V_{vs}).$$

The cell inlet port temperature $T_{IN,\,i}$ corresponding to the cell channel i can thus be determined from values of the abovementioned $Q_{LLC}$, $T_{IN}$, $T_{ea}$, and $V_{vs}$.

Figure 16:
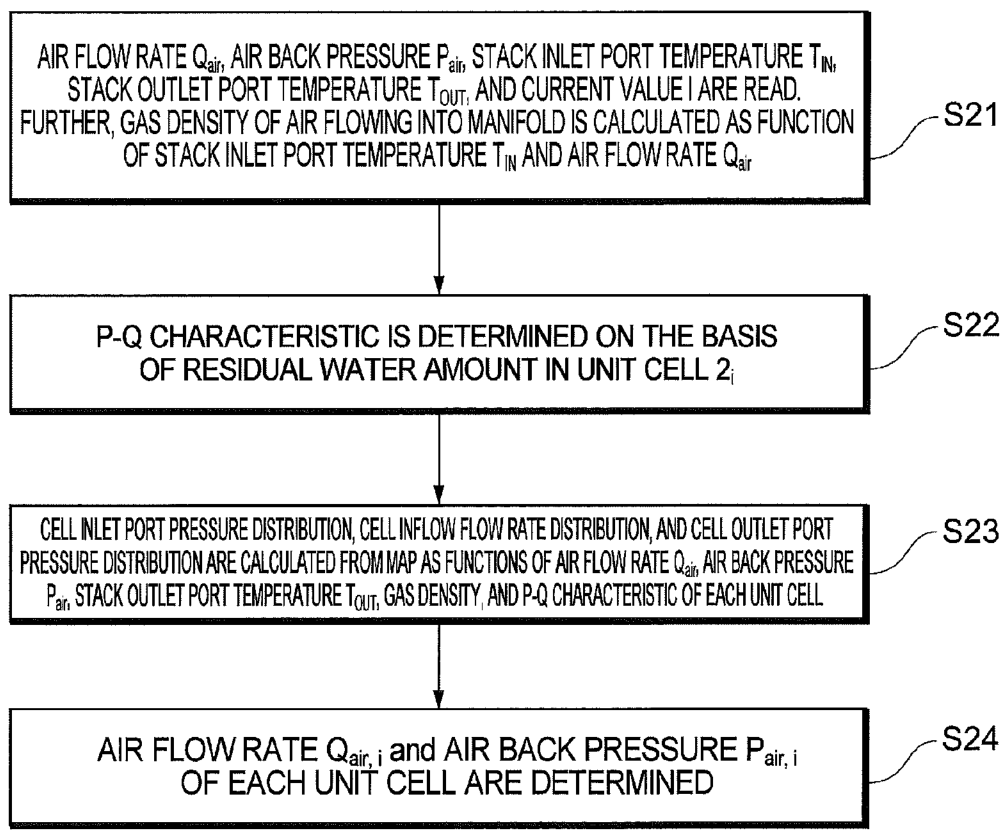
FIG. 16 is a flowchart illustrating a method of calculating the air flow rate and air back pressure for each unit cell according to the embodiment.

(2) Calculation of Air Flow Rate $Q_{air,\,i}$ and Air Back Pressure $P_{air,\,i}$ As shown in FIG. 16, first, the air flow rate $Q_{air}$, air back pressure $P_{air}$, stack inlet port temperature $T_{IN}$, stack outlet port temperature $T_{OUT}$, and current value I are read (step S21). Here, the air flow rate $Q_{air}$, air back pressure $P_{air}$, and stack outlet port temperature $T_{OUT}$ are the detection values of the flow rate sensor F1, pressure sensor P1, and temperature sensor T2, respectively. In step S21, the gas density of air flowing into the manifold 15*a* is calculated as a function of the stack inlet port temperature $T_{IN}$ and air flow rate $Q_{air}$.

Figure 17:
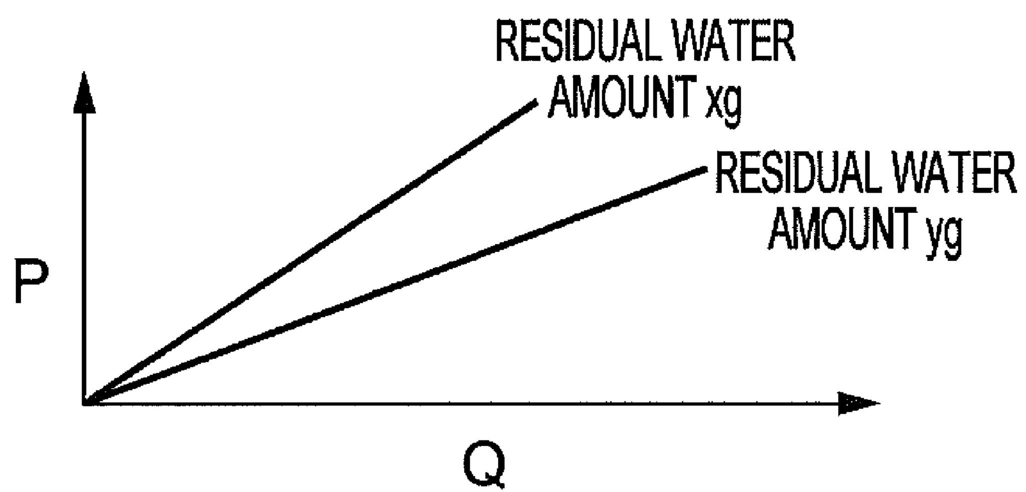
FIG. 17 is a map illustrating the P-Q characteristic of the unit cell corresponding to the residual water amount according to the embodiment.

In the next step S22, a P-Q characteristic (characteristic representing the relationship between the air back pressure and air flow rate) of a unit cell $\mathbf{2}_i$ is determined on the basis of the residual water amount in the unit cell Z. For example, as shown in FIG. 17, a map indicating the P-Q characteristic (pressure-flow rate characteristic) corresponding to a plurality of residual water amounts (x>y) is acquired in advance, and a P-Q characteristic corresponding to the immediately preceding residual water amount (total amount of residual water on the cathode side of the unit cell $\mathbf{2}_i$) calculated by the flowchart shown in FIG. 8 is determined.

Figure 18A:
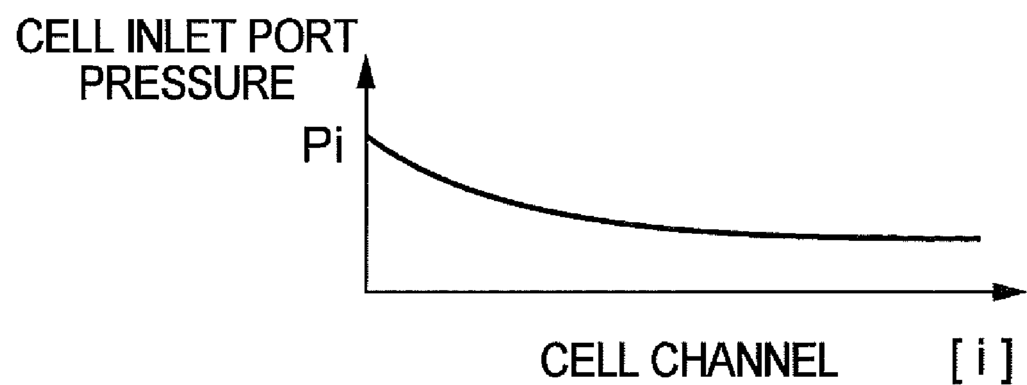
FIG. 18A illustrates the cell inlet port pressure distribution according to the embodiment.
Figure 18B:
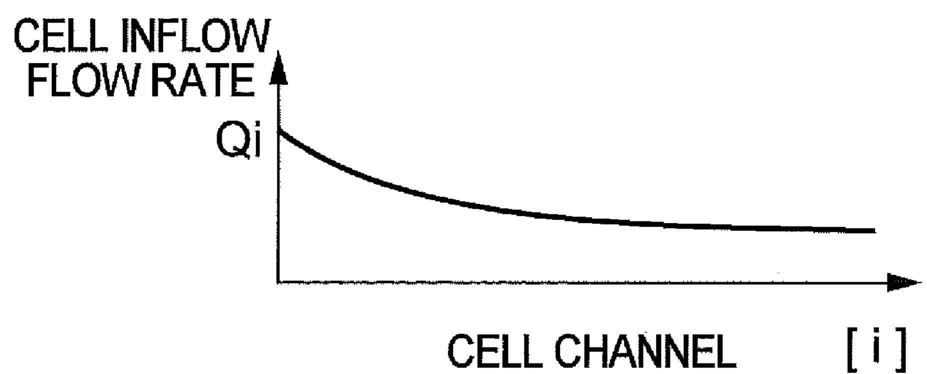
FIG. 18B illustrates the cell inflow flow rate distribution according to the embodiment.
Figure 18C:
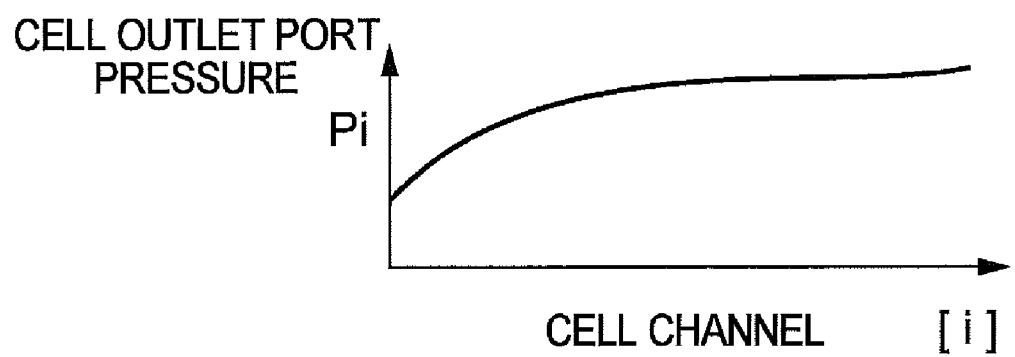
FIG. 18C illustrates the cell outlet port pressure distribution according to the embodiment.

Then, the cell inlet port pressure distribution, cell inflow flow rate distribution, and cell outlet port pressure distribution are calculated from the map as functions of the air flow rate $Q_{air}$, air back pressure $P_{air}$, stack outlet port temperature $T_{OUT}$, gas density calculated hereinabove, and P-Q characteristic of each unit cell $\mathbf{2}_i$ (step S23). Examples thereof are shown in FIG. 18A to 18C. The cell inflow flow rate shown in FIG. 18B and the cell outlet port pressure shown in FIG. 18C correspond to the air flow rate $Q_{air,\,i}$ and air back pressure $P_{air,\,i}$ corresponding to the cell channel i and, therefore, can be determined (S24).

The hydrogen flow rate $Q_{H2,\,i}$ and hydrogen pressure $P_{H2,\,i}$ of the unit cell $\mathbf{2}_i$ can be also calculated (this calculation is not described in detail) by a method similar to that used for calculating the air flow rate $Q_{air,\,i}$ and air back pressure $P_{air,\,i}$. In this case, the cell inlet port pressure shown in FIG. 18A corresponds to the hydrogen pressure $P_{H2,\,i}$, and the cell inflow flow rate shown in FIG. 18B corresponds to the hydrogen flow rate $Q_{H2,\,i}$ and therefore the cell inlet port pressure and cell inflow flow rate can be determined.

(3) Calculation of Cell Outlet Port Temperature $T_{OUT,\,i}$

Figure 19:
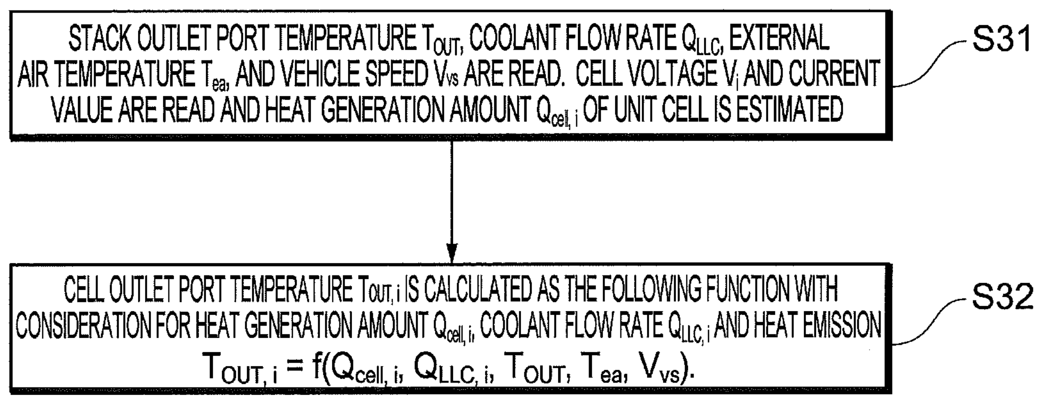
FIG. 19 is a flowchart illustrating a method of calculating the cell outlet port temperature according to the embodiment.

As shown in FIG. 19, first, a stack outlet port temperature $T_{OUT}$ is read as a detection value of the temperature sensor T2 (step S31). Then, the coolant flow rate $Q_{LLC}$, external air temperature $T_{ea}$, and vehicle speed $V_{vs}$ are read in the same manner as in the above-described case of the stack inlet port temperature $T_{IN}$. The cell voltage $V_i$ and current value I are then read and a heat generation amount $Q_{cell,\,i}$ of each unit cell $\mathbf{2}_i$ is estimated from the I-V characteristic for each unit cell Z.

In this case, a voltage value of each unit cell $\mathbf{2}_i$ detected by a cell monitor (not shown in the figure) can be used as the cell voltage $V_i$. However, the cell voltage $V_i$ can be also estimated by providing an I-V map (depends on the amount of generated electricity, air flow rate, hydrogen flow rate, air back pressure, and hydrogen pressure) for each unit cell $\mathbf{2}_i$, that is, without using a sensor such as the cell monitor. The heat generation amount $Q_{cell,\,i}$ depends on heat generation determined by TΔS and heat loss determined by overvoltage.

Figure 20:
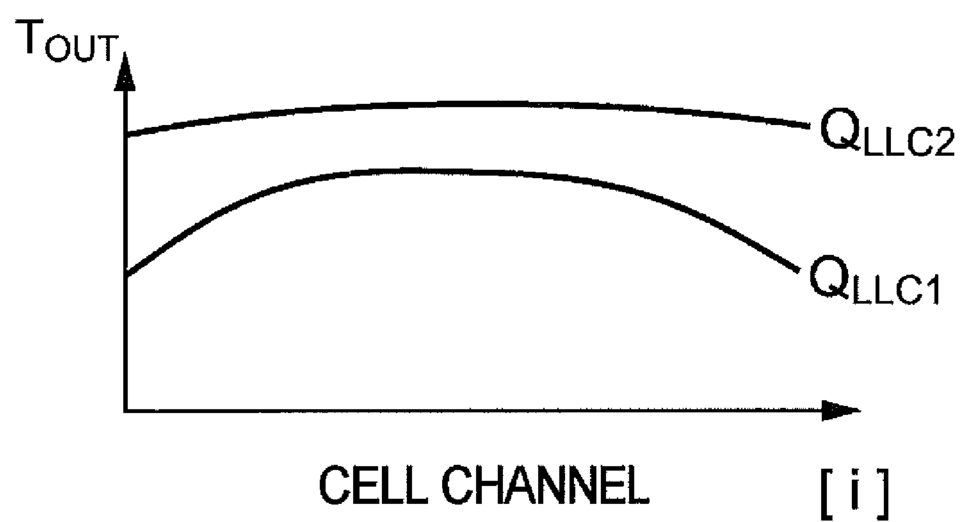
FIG. 20 illustrates the relationship between the unit cell position and the coolant flow rate with respect to the effect of heat emission on the stack outlet port temperature according to the embodiment.

The stack outlet port temperature $T_{OUT}$ is affected by heat emission according to the position of the unit cell $\mathbf{2}_i$ in the cell stack 3, in the same manner as the above-described stack inlet port temperature $T_{IN}$. For example, as shown in FIG. 20, where the coolant flow rate $Q_{LLC}$ is higher ($Q_{LLC1}>Q_{LLC2}$), the stack outlet port temperature $T_{OUT}$ is not affected by heat emission.

Accordingly, the cell outlet port temperature $T_{OUT,\,i}$ is calculated as the following function with consideration for the coolant flow rate $Q_{LLC,\,i}$ and heat emission, in addition to the heat generation amount $Q_{cell,\,i}$ (step S32).

$$T_{OUT,i}=f(Q_{cell,i},Q_{LLC,i},T_{OUT},T_{ea},V_{vs}).$$

As a result, it is possible to determine the cell outlet port temperature $T_{OUT,\,i}$ corresponding to the cell channel i from the detection values or estimated values indicated in these parameters.

The $Q_{LLC,\,i}$ is the flow rate of coolant supplied to each unit cell 2 and takes into account the flow distribution spread with respect to the above-mentioned coolant flow rate $Q_{LLC}$ when the fuel cell stack 1 is taken as a unit. More specifically, the $Q_{LLC,\,i}$ corresponding to the cell channel i can be calculated by creating in advance a map representing the relationship between the coolant flow rate $Q_{LLC}$ and cell channel i for each of several coolant flow rates $Q_{LLC}$ and then using the map.

According to the procedures of sections (1) to (3) explained hereinabove, values taking into account the temperature distribution (spread in heat emission amount and the like) and pressure loss distribution (spread if flow distribution of oxidizing gas, fuel gas, and coolant) in the cell stacking direction can be used for the state parameters of each unit cell $\mathbf{2}_i$ in the flowchart (steps S1, S2, and S4) shown in FIG. 8. As a result, the residual water amount distribution and water content distribution (water vapor distribution) can be estimated with better accuracy for all of the unit cells 2 (that is, in the cell stacking direction) than in the case in which the fuel cell 1 is considered as a stack unit.

D. Method of Estimating Nitrogen Gas Amount in Fuel Cell

A method of estimating a nitrogen gas amount in the present embodiment uses the procedure similar to that of the above-described method of estimating the water vapor amount. In this case, the nitrogen gas amount distribution is estimated separately for the anode side and cathode side. Further, not only the distribution in the cell plane, but also the distribution in the cell stacking direction is estimated. First, a method of estimating the nitrogen gas distribution in the cell plane will be described. Then, it will be explained how to take the temperature spread and flow distribution spread in the cell stacking direction into account in the estimation, and a method of estimating the nitrogen gas distribution in the cell stacking direction will be explained.

1. Method of Estimating Nitrogen Gas Distribution in the Cell Plane

Figure 21:
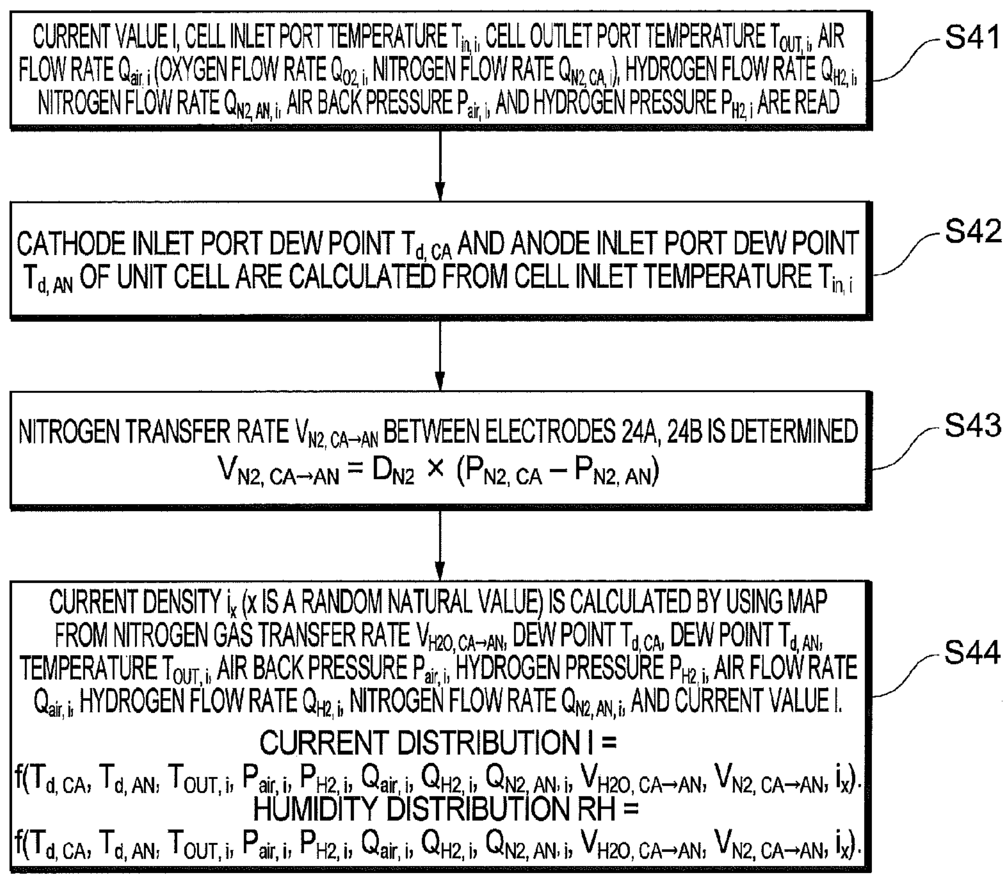
FIG. 21 is a flowchart illustrating a method of estimating the nitrogen gas distribution in the cell plane according to the embodiment.

As shown in FIG. 21, first, the current value I, cell inlet port temperature $T_{in,\,i}$, cell outlet port temperature $T_{OUT,\,i}$, air flow rate ($Q_{air,\ i}$ (oxygen flow rate $Q_{O2,\ i}$, nitrogen flow rate $Q_{N2,\ CA,\ i}$, oxygen:nitrogen=21:79), hydrogen flow rate $Q_{H2,\ i}$, nitrogen flow rate $Q_{N2,\ AN,\ i}$, air back pressure $P_{air,\ i}$, and hydrogen pressure $P_{H2,\ i}$ are read (step S41).

The oxygen flow rate $Q_{O2,\ i}$ and nitrogen flow rate $Q_{N2,\ CA,\ i}$ are supply flow rates of oxygen gas and nitrogen gas flowing into the air inlet port 28*a* of the unit cell Z. The nitrogen flow rate $Q_{N2,\ AN,\ i}$ is a flow rate of nitrogen gas flowing into the hydrogen inlet port 27*a* of the unit cell $\mathbf{2}_i$. When the fuel cell includes only one unit cell 2 or when the temperature spread and flow distribution spread in the cell stacking direction are not taken into account, each value is as follows.

$T_{in,\ i}$: detection value obtained with the temperature sensor T1

$T_{OUT,\ i}$: detection value obtained with the temperature sensor T2

$Q_{air,\ i}$: detection value obtained with the flow rate sensor F1

$Q_{H2,\ i}$: hydrogen supply flow rate determined from the detection value obtained with the flow rate sensor F2

$P_{air,\ i}$: detection value obtained with the pressure sensor P1

$P_{H2,\ i}$: detection value obtained with the pressure sensor P2

The oxygen flow rate $Q_{O2,\ i}$ and nitrogen flow rate $Q_{N2,\ CA,\ i}$ are determined by the ratio of oxygen and nitrogen in the air from $Q_{air,\ i}$, which is the detection value obtained with the flow rate sensor F1.

The gas flow rate $Q_{AN,\ i}$ of the gas flowing to the anode side is a sum total of the hydrogen flow rate $Q_{H2,\ i}$, nitrogen flow rate $Q_{N2,\ AN,\ i}$, and water vapor flow rate $Q_{H2O,\ i}$ and can be determined by a sum total of the hydrogen gas flow rate $Q_{H2.\ INJ}$ from the injector 45 and the pump gas flow rate $Q_{PUMP}$ created by the hydrogen pump 46 (hydrogen gas flow rate $Q_{H2.\ INJ}$+pump gas flow rate $Q_{PUMP}$).

The hydrogen gas flow rate $Q_{H2.\ INJ}$ can be determined by a general function f (P, Flag). In this function, P is an upstream pressure of the injection 45 and Flag is an injector open signal.

The pump gas flow rate $Q_{PUMP}$ can be determined by a general function f(rpm, ΔP, T). In this function, ΔP is obtained by mapping the relationship with the current value of the pump by preceding estimations. rpm is a pump revolution speed, T is a temperature inside the pump.

The pump gas flow rate $Q_{PUMP}$ is constituted by the flow rates of hydrogen gas, nitrogen gas, and water vapor. The ratio of hydrogen gas and nitrogen gas in the pump gas flow rate $Q_{PUMP}$ can be determined from power consumed by the pump, and the water vapor flow rate can be determined from the moisture amount in the hydrogen outlet port 27*b* that is defined by the water vapor distribution estimated hereinabove. The hydrogen gas flow rate $Q_{H2.PUMP}$, nitrogen gas flow rate $Q_{N2.PUMP}$, and water vapor flow rate $Q_{H2O.PUMP}$ inside the pump gas flow rate $Q_{PUMP}$ can thus be found. Therefore, the gas flow rate $Q_{AN,\ i}$=hydrogen gas flow rate $Q_{H2.\ INJ}$+hydrogen gas flow rate $Q_{H2.PUMP}$+nitrogen gas flow rate $Q_{N2.PUMP}$+water vapor flow rate $Q_{H2O.PUMP}$ can be found, the hydrogen flow rate $Q_{H2,\ i}$ becomes hydrogen gas flow rate $Q_{H2.\ INJ}$+hydrogen gas flow rate $Q_{H2.PUMP}$, and the nitrogen flow rate $Q_{N2,\ AN,\ i}$ becomes the nitrogen gas flow rate $Q_{N2.PUMP}$.

When the fuel cell 1 has a plurality of unit cells 2, there is a spread in heat emission amount and spread of reaction gas and coolant flow distribution among the unit cells 2 in the cell stacking direction. Therefore, it is preferred that the cell inlet port temperature $T_{in,\ i}$ that takes these spreads into account be used. A method of taking these spreads into account will be described below.

In step S42 shown in FIG. 21, the cathode inlet port dew point $T_{d,\ CA}$ and anode inlet port dew point $T_{d,\ AN}$ of each unit cell $\mathbf{2}_i$ are calculated from the cell inlet temperature $T_{in,\ i}$ in the same manner as in the above-described step S2. In the present embodiment, the humidifier 30 is used in the fuel cell system 1. Therefore, the respective cell inlet port temperature $T_{in,\ i}$ can be used as the cathode inlet port dew point $T_{d,\ CA}$ and anode inlet port dew point $T_{d,\ AN}$. Thus, when the air inlet port 28*a* and hydrogen inlet port 27*a* are close to the coolant inlet port 29*a*, the following equation is valid and the spread of dew point in the stack can be taken into account.

$$T_{d,CA}=T_{d,AN}=T_{in,i}$$

In step S43 shown in FIG. 21, the nitrogen transfer rate $V_{N2,\ CA\rightarrow AN}$ between the electrodes 24A, 24B is determined. The nitrogen transfer rate $V_{N2,\ CA\rightarrow AN}$ is calculated by the following formula.

$$V_{N2,CA\rightarrow AN}=D_{N2}\times(P_{N2,CA}-P_{N2,AN})$$

Here, $P_{N2,\ CA}$ is a nitrogen gas partial pressure on the electrode 24B side of the unit cell $\mathbf{2}_i$ and calculated from the cathode inlet port dew point $T_{d,\ CA}$. $P_{N2,\ AN}$ is a nitrogen gas partial pressure on the electrode 24A side of the unit cell $\mathbf{2}_i$ and calculated from the anode inlet port dew point $T_{d,\ AN}$. $D_{N2}$ is a nitrogen diffusion coefficient in the electrolyte membrane 23. A constant value can be used as $D_{N2}$, but since $D_{N2}$ depends on humidity, it is preferred that this dependence be taken into account.

Figure 22:
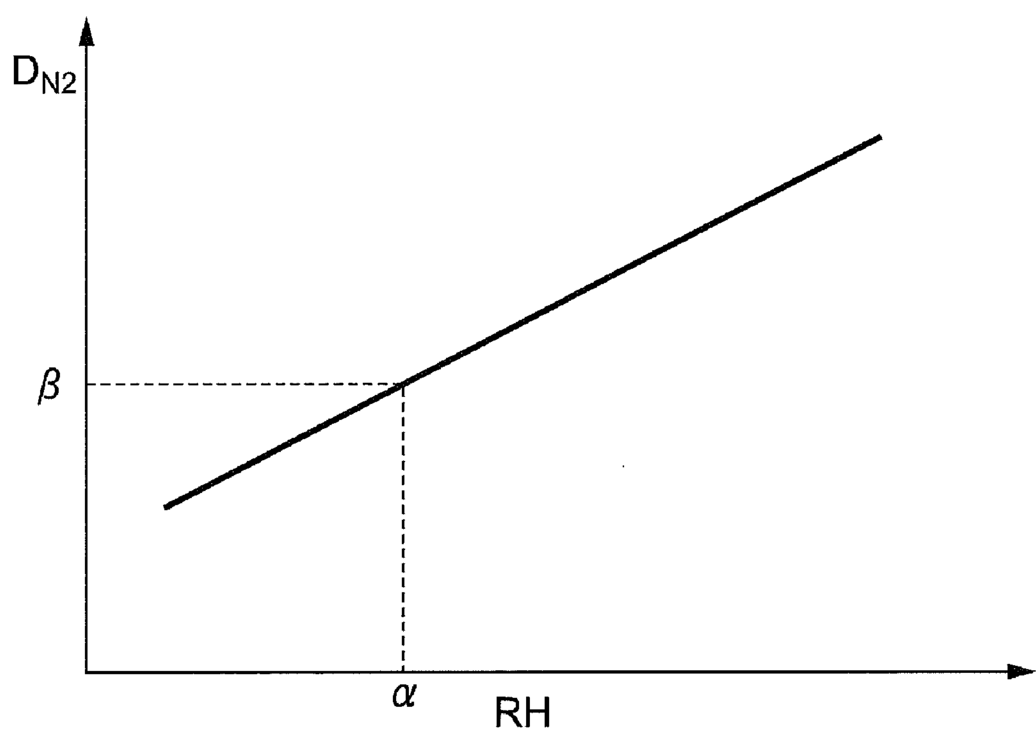
FIG. 22 is a characteristic map representing the relationship between the relative humidity of the electrolyte membrane and $D_{N2}$ according to the embodiment.

When $D_{N2}$ is determined by taking humidity into account, for example, a characteristic map representing the relationship between $D_{N2}$ and relative humidity of the electrolyte membrane 23, such as shown in FIG. 22, is created in advance, and the map can be used to find the value of $D_{N2}$ corresponding to the relative humidity of the electrolyte membrane 23. More specifically, the value (β) of $D_{N2}$ that is used for the present estimation can be determined from the map by using a relative humidity a of the electrolyte membrane 23 estimated during shutdown in the previous operation cycle of the fuel cell system 1, a relative humidity a of the electrolyte membrane 23 estimated in a standby (stop) mode of the fuel cell system 1, and a relative humidity α of the electrolyte membrane 23 estimated immediately prior to the present estimation in the fuel cell system 1.

Figure 23:
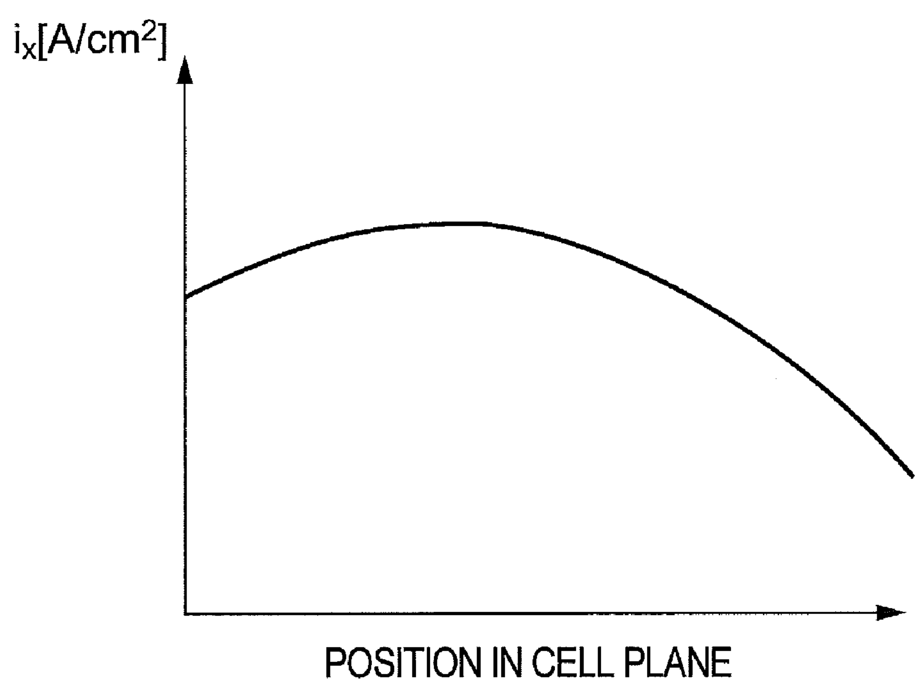
FIG. 23 illustrates a current density vs. a position in the cell plane according to the embodiment.

In step S44 shown in FIG. 21, a current density $i_x$ (x is a random natural value) is calculated by using a map from the nitrogen gas transfer rate $V_{N2,\ CA\rightarrow AN}$, dew point $T_{d,\ CA}$, dew point $T_{d,\ AN}$, temperature $T_{OUT,\ i}$, air back pressure $P_{air,\ i}$, hydrogen pressure $P_{H2,\ i}$, hydrogen flow rate $Q_{H2,\ i}$ nitrogen flow rate $Q_{N2,\ AN,\ i}$, and current value I. The current density $i_x$ is a current density in any surface area in the cell plane. For example, if each surface area at x=4 is denoted by $s_1$ to $s_4$, then $I=i_1\times s_1+i_2\times s_2+i_3\times s_3+i_4\times s_4$. An example of results obtained in calculating the distribution of current density $i_x$ is shown in FIG. 23.

Further, in step S44, the current distribution and relative humidity distribution in the cell plane are calculated. The functions I and RH representing these distributions are presented below. The sensitivity of the functions I and RH to respective parameters ($T_{d,\ CA}$, $T_{d,\ AN}$, $T_{OUT,\ i}$, $P_{air,\ i}$, $P_{H2,\ i}$, $Q_{H2,\ i}$, $Q_{N2,\ AN,\ i}$, $V_{N2,\ CA\rightarrow AN}$, $i_x$) is mapped in advance. Further, the overvoltage distribution in the cell plane may be also calculated from these parameters.

$$I=f(T_{d,CA},T_{d,AN},T_{OUT,i},P_{air,i},P_{H2,i},Q_{H2,i},Q_{N2,AN,i},V_{H2O,CA\rightarrow AN},V_{N2,CA\rightarrow AN},i_x)$$

$$RH=f(T_{d,CA},T_{d,AN},T_{OUT,i},P_{air,i},P_{H2,i},Q_{H2,i},Q_{N2,AN,i},V_{H2O,CA\rightarrow AN,i},V_{N2,CA\rightarrow AN},i_x)$$

Figure 24:
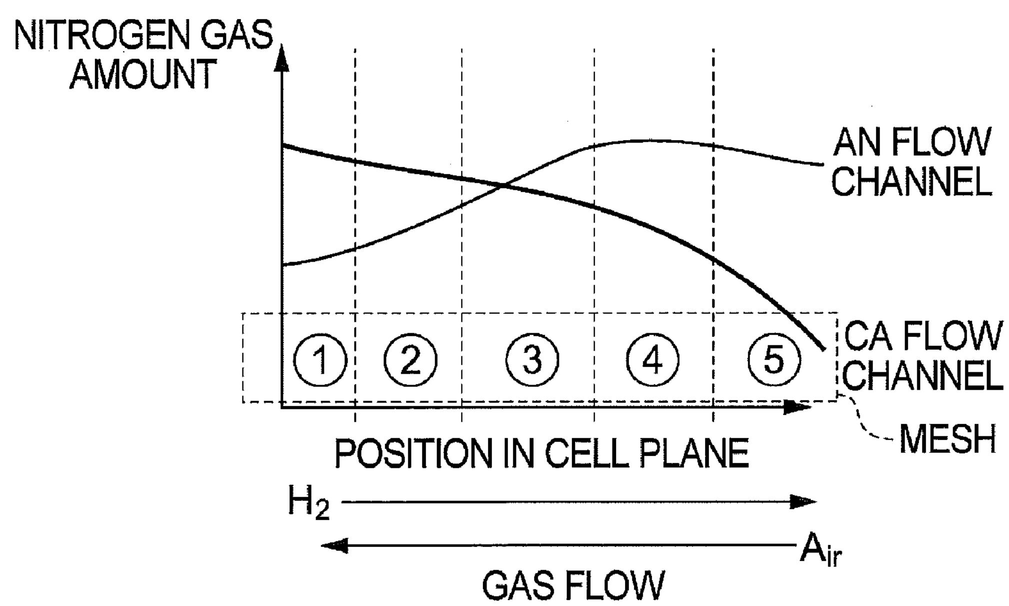
FIG. 24 illustrates the residual nitrogen gas amount distribution in the cell plane according to the embodiment.

In step S44, $D_{N2}$ is determined by using the map shown in FIG. 22 from the calculated relative humidity at a predetermined position in the reaction gas flow channel, $V_{N2, CA \rightarrow AN}$ is determined from the $D_{N2}$ by using the above-described equation, and in use of this $V_{N2, CA \rightarrow AN}$ or the like, a relative humidity at yet another position is determined from the function RH. The $V_{N2, CA \rightarrow AN}$, for example, for each of the five meshes shown in FIG. 24 is determined by repeating the aforementioned procedure, the determined rate $V_{N2, CA \rightarrow AN}$ is recalculated as the nitrogen gas amount, and finally the nitrogen gas amount distribution in the cell plane is calculated.

A variation amount of nitrogen gas amount (nitrogen gas balance) of the unit cell $\mathbf{2}_i$ in a certain calculation time can be calculated by the above-described procedure, and the nitrogen gas distribution in the hydrogen flow channel 25A and the nitrogen gas distribution in the air flow channel 25B can be determined. The nitrogen gas balance can be computed with a coarseness determined by the number of meshes (for example, five meshes shown in FIG. 24) having sensitivity in the cell plane, and which nitrogen gas is realized in which position inside the cell can be estimated with good accuracy.

$T_{IN, i}$, $T_{OUT, i}$, $P_{air, i}$, $P_{H2, i}$, $Q_{O2, i}$, $Q_{N2, CA, i}$, $Q_{H2, i}$ and $Q_{N2, AN, i}$ for each unit cell $\mathbf{2}_i$ in which the temperature spread and flow distribution spread in the cell stacking direction is taken into account can be determined in the same manner as in the above-described estimation of water vapor distribution. $Q_{O2, i}$ and $Q_{N2, CA, i}$ of each cell $\mathbf{2}_i$ can be determined by a ratio of oxygen gas and nitrogen gas from the $Q_{air, i}$ of each unit cell $\mathbf{2}_1$ calculated in the above-described manner.

Thus, values that take into account the temperature distribution (spread of heat radiation amount and the like) and pressure loss distribution (flow distribution spread of oxidizing gas, fuel gas, and coolant) in the cell stacking direction can be used for state parameters of each unit cell $\mathbf{2}_i$ in the flowchart (steps S41, S42, and S44) shown in FIG. 21. As a result, the nitrogen gas amount distribution can be estimated with better accuracy for all of the unit cells 2 (that is, in the cell stacking direction) than in the case in which the fuel cell 1 is considered as a stack unit.

E. Control Example Using Estimation Results

A control example using the estimation results obtained with the abovementioned estimation method will be explained below.

In the control example, highly accurate estimation results obtained with the above-described estimation method are used, the water vapor amount and nitrogen gas amount at a plurality of predetermined positions inside the electrolyte membrane 23 and reaction gas flow channel that have been estimated by the estimation unit 67 during the operation stop in intermittent operation are compared with thresholds set for each other predetermined position, and when at least either of the water vapor amount and nitrogen gas amount at at least one position exceeds the predetermined threshold, gas circulation in the circulation flow channel 42 is performed and the amount of water vapor and nitrogen gas inside the fuel cell 1 is reduced. The threshold for each of the predetermined positions is set with consideration for the stacking direction of the unit cells 2 and flow channel direction of the reaction gas flow channel. Where both the water vapor amount and nitrogen gas amount at at least one position exceed the predetermined thresholds, the gas circulation in the circulation flow channel 42 may be also performed. The control relating to such processing, is executed by the operation control unit 68 that has received a signal from the estimation unit 67.

Figure 25:
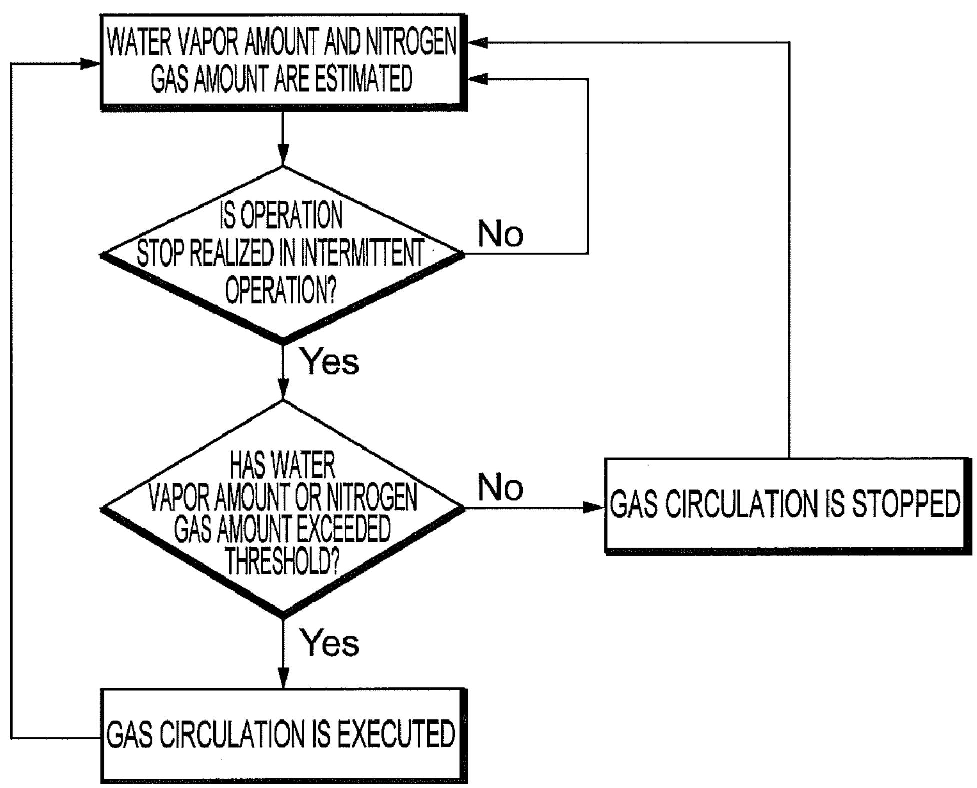
FIG. 25 is a flowchart of a control example according to the embodiment.
Figure 26:
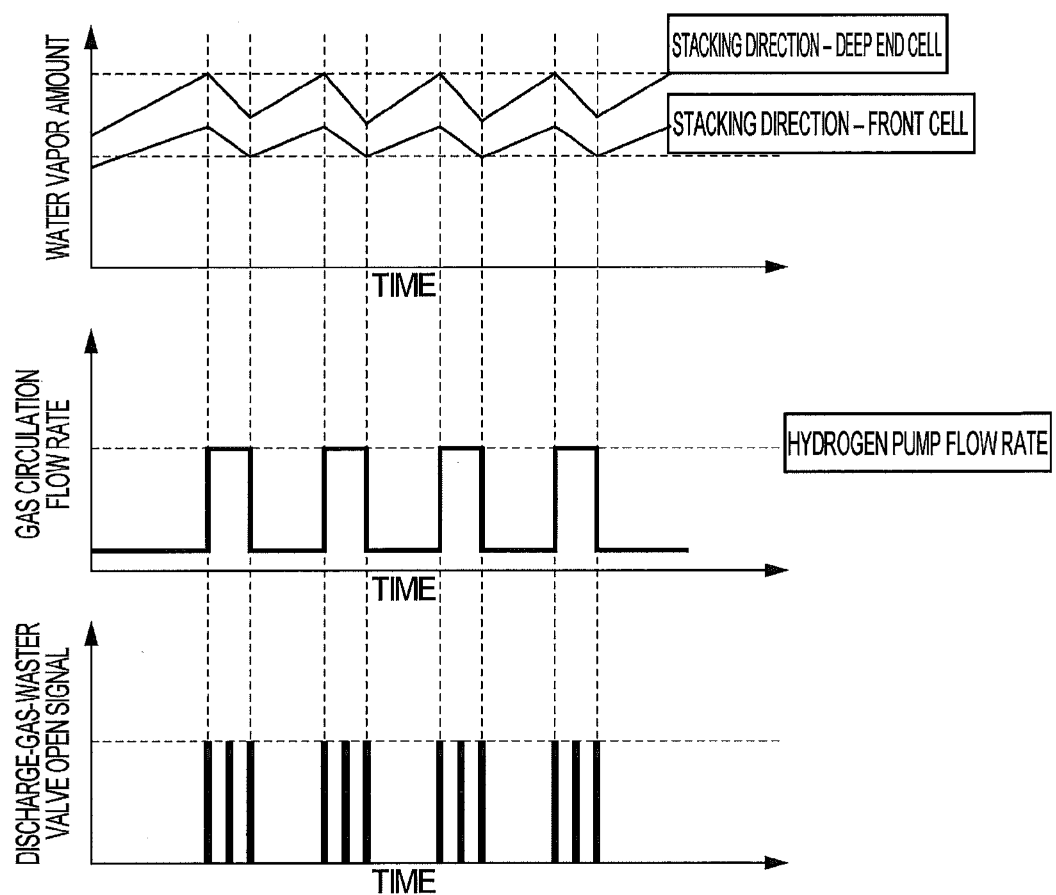
FIG. 26 is a timing chart illustrating the timing for performing gas circulation with respect to a threshold of water vapor amount during the operation stop in intermittent operation.
Figure 27:
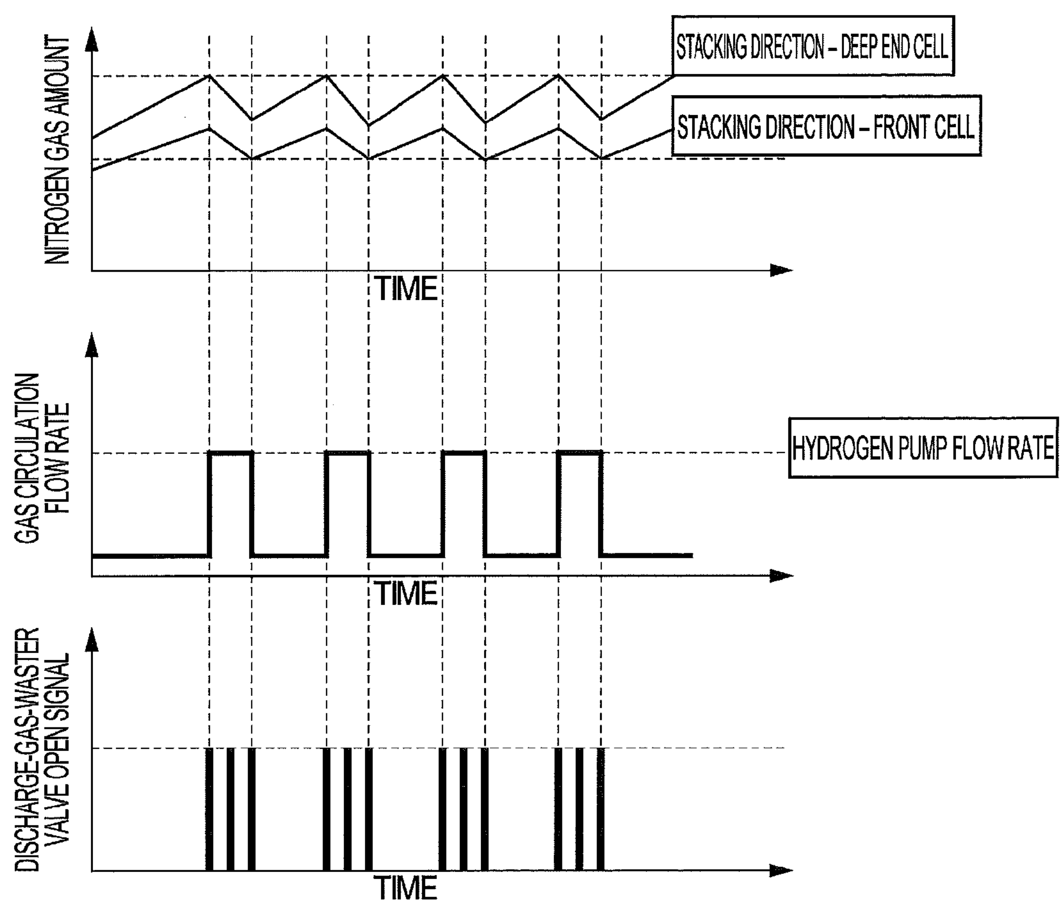
FIG. 27 is a timing chart illustrating the timing for performing gas circulation with respect to a threshold of nitrogen gas amount during the operation stop in intermittent operation.

FIG. 25 is a flowchart of the present control example. FIG. 26 and FIG. 27 are flowcharts showing the timing at which gas circulation is performed during the operation stop of intermittent operation.

First, the distributions of water vapor amount and nitrogen gas amount, that is, of the residual water amount, water content, and nitrogen gas amount, at a plurality of predetermined positions inside the electrolyte membrane 23 of the fuel cell 1 or the reaction gas flow channel are estimated. The estimation of the water vapor amount and nitrogen gas amount is conducted continuously, intermittently, or periodically. Then, it is determined whether the operation stop of intermittent operation is realized. Where the operation stop of intermittent operation is realized, the water vapor amount and nitrogen gas amount at each predetermined position inside the electrolyte membrane 23 or reaction gas flow channel are compared with respective thresholds at these positions. Then, it is determined whether or not the water vapor amount or nitrogen gas amount has exceeded the threshold at any one position, that is, whether or not water vapor or nitrogen gas is retained inside the fuel cell 1 in an amount equal to or greater than the predetermined amount. Where the operation stop of intermittent operation is not realized, water vapor amount or nitrogen gas amount are estimated again.

Figure 28:
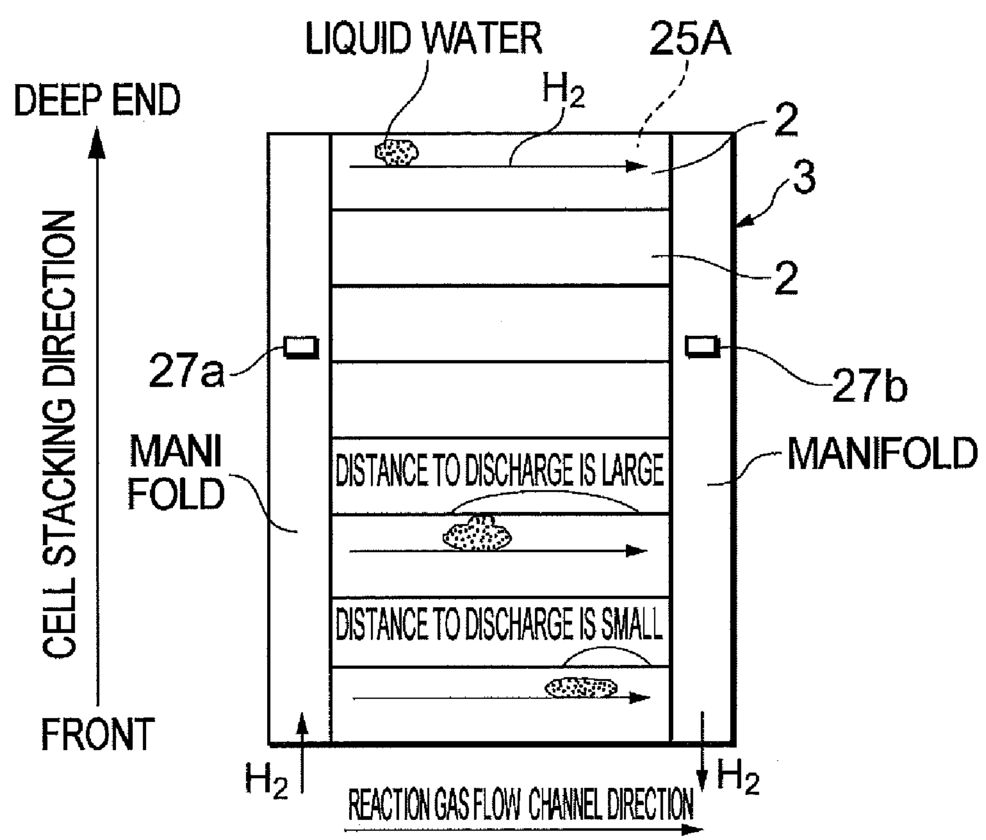
FIG. 28 illustrates schematically the flow of reaction gas in the cell stack according to the embodiment.
Figure 29:
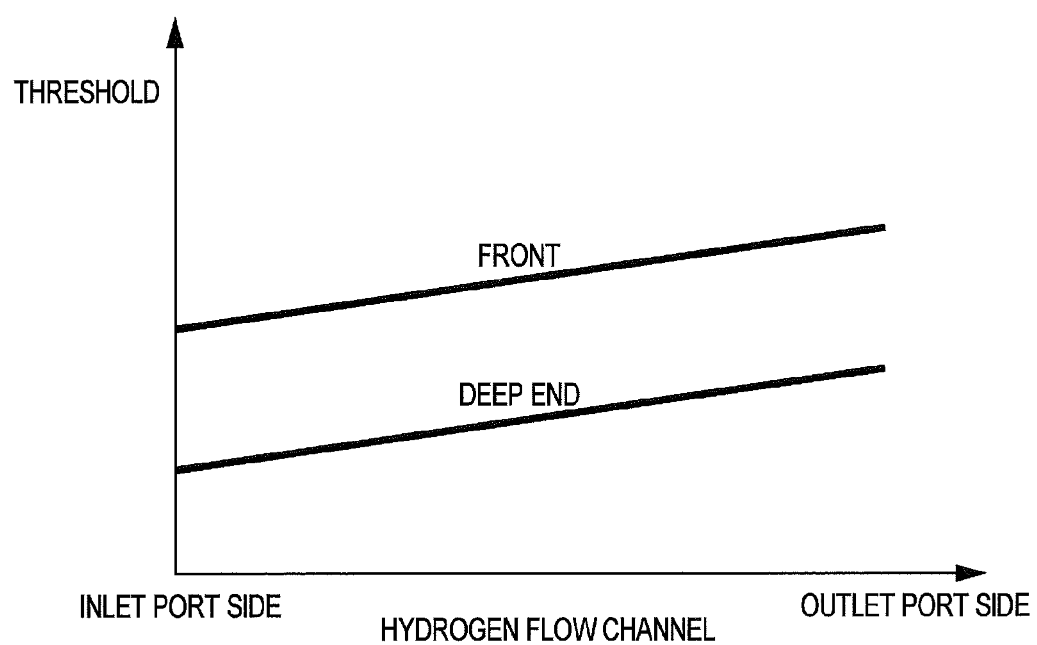
FIG. 29 illustrates the relationship between the stacking direction of the cells and the reaction gas flow channel direction.

The thresholds for the water vapor amount or nitrogen gas amount are set with consideration for the stacking direction of unit cells 2 and flow channel direction of the reaction gas flow channel shown in FIG. 28. More specifically, the circulating gas can easily flow frontward of the stacking direction and can hardly flow in the rearward direction. Therefore, different thresholds are set for the front side and deep side, as shown in FIG. 29, and the threshold is lower on the deep side than on the front side. Further, the distance from the outlet port side of the reaction gas flow channel (hydrogen flow channel 25A) to the discharge side is less than that from the inlet port side, as shown in FIG. 28, and the water vapor gas or nitrogen gas is easily discharged. Therefore, as shown in FIG. 29, the threshold is higher on the outlet port side than on the inlet port side of the reaction gas flow channel as shown in FIG. 29. As a result, the discharge can be adequately and reliably performed in a portion where the water vapor or nitrogen gas is easily accumulated.

When it is determined that the water vapor amount or nitrogen gas amount at any position inside the electrolyte membrane 23 or the reaction gas flow channel exceeds the threshold corresponding to this position, the hydrogen pump 46 is started at the timing shown in FIG. 26 and FIG. 27 and gas circulation in the circulation flow channel 42 is performed. As a result, extra water vapor or nitrogen gas located inside the fuel call 1 is discharged from the fuel cell 1. In this case, the discharge-gas-water valve 48 of the circulation flow channel 42 is opened and the extra water vapor or nitrogen gas is discharged from the discharge flow channel 47. The water vapor amount and nitrogen gas amount is then estimated again, and when the water vapor amount or nitrogen gas amount is equal to or less than the threshold during the operation stop of intermittent operation, the gas circulation is stopped. The estimation of water vapor amount and nitrogen gas amount is thereafter repeated, the results obtained are compared with the threshold, and gas circulation is performed when the threshold is exceeded According to the above-described embodiment, when the water vapor amount or nitrogen gas amount at any position inside the electrolyte membrane 23 of the fuel cell 1 or the reaction gas flow channel exceeds a threshold that has been set for each position, gas is supplied to the hydrogen flow channel 25A. Therefore, excess water vapor or nitrogen gas can be reliably prevented from remaining inside the fuel cell 1 during the operation stop of intermittent operation. As a result, the insufficient reaction gas supply and drop of cell voltage can be inhibited when the next operation cycle is started to generate power and fuel consumption can be improved. Further, since the threshold is set with consideration for the stacking direction of unit cells 2 and flow channel direction of the reaction gas flow channel, the frequency or timing of gas supply cycles can be optimized. As a result, the amount of water vapor or nitrogen gas can be efficiently reduced and extra supply of gas can be inhibited.

According to the above-described embodiment, the hydrogen flow channel 25A communicates with the circulation flow channel 42 that serves to treat the gas discharged from the fuel cell 1 and supply the treated gas to the fuel cell 1, and the operation control unit 68 performs gas circulation in the circulation flow channel 42 when the water vapor amount or nitrogen gas amount exceeds the threshold. As a result, water vapor and nitrogen gas can be advantageously discharged from the fuel cell 1.

The discharge flow channel 47 leading to the outside of the fuel cell system 100 is connected via the discharge-gas-water valve 48 to the circulation flow channel 42, and the operation control unit 68 opens the discharge-gas-water valve 48 during gas circulation and performs the discharge of water vapor and nitrogen gas via the discharge flow channel 47. In such a case, water vapor and nitrogen gas can be effectively discharged.

The estimation unit 67 estimates a water content distribution in the electrolyte membrane 23 and a residual water amount distribution in the hydrogen flow channel 25A and air flow channel 25B in the cell plane of each unit cell 2 with consideration for water transfer performed between the anode electrode 24A and the cathode electrode 24B via the electrolyte membrane 23 as the estimation of the water vapor amount, and estimates a nitrogen gas distribution in hydrogen flow channel 25A and air flow channel 25B in the cell plane of each unit cell 2 with consideration for nitrogen gas transfer performed the anode electrode 24A and the cathode electrode 24B via the electrolyte membrane 23 as the estimation of the nitrogen gas amount. In such a case, water transfer between the electrodes is taken into account and therefore a high estimation accuracy of water vapor amount can be ensured. Since nitrogen gas transfer between the electrodes is taken into account, a high estimation accuracy of nitrogen gas amount can be ensured. In addition, since gas is caused to flow by using the results of such high estimation accuracy, the timing and frequency thereof can be optimized. As a consequence, water vapor and nitrogen gas can be efficiently discharged.

Figure 30:
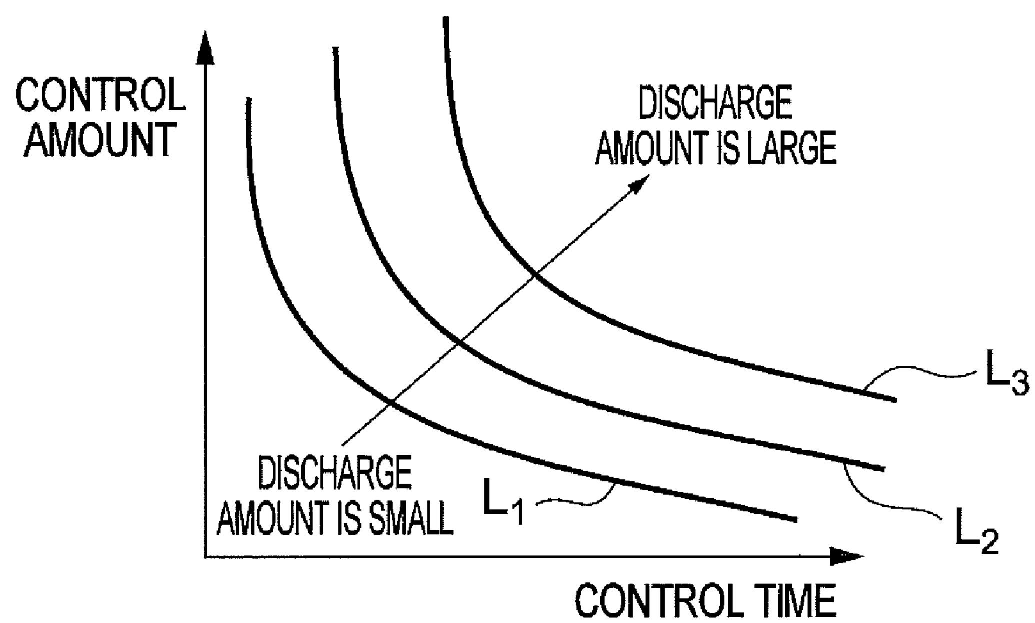
FIG. 30 illustrates a control example of the hydrogen pump when gas circulation is performed.

Further, the discharge control of water vapor or nitrogen gas may be performed not only, for example, by ON/OFF control of the hydrogen pump 46, but also by changing the control amount and control time according to the position at which the water vapor or nitrogen gas remain or amount thereof. In the graph shown in FIG. 30, a control amount (that is, revolution speed) of the hydrogen pump 46 is plotted against the ordinate and a control time (that is, rotation time) of the hydrogen pump 46 is plotted against the abscissa. Curves $L_1$ to $L_3$ in FIG. 30 are control lines of the hydrogen pump 46 used for gas circulation that correspond to the amount of water vapor and nitrogen gas or position in the cell stacking direction or reaction gas flow channel direction. For example, when the amount of water vapor or nitrogen gas is comparatively large, the control line $L_3$ is used, and when the amount of water vapor or nitrogen gas is comparatively small, the control line $L_1$ is used. Further, when the position at which the water vapor or nitrogen gas is located is close to the deep side of the cell stacking direction or gas inlet portion (27*a*, 28*a*) in the cell plane, the control line $L_3$ is used. Conversely, when the position at which the water vapor or nitrogen gas is located is at a location with high discharge ability, the control line $L_1$ is used. With such a method, the efficiency of gas circulation operation can be increased and fuel loss can be reduced to a minimum by driving the hydrogen pump 46. In another example, either of the control amount and control time of the hydrogen pump 46 may be variable.

The preferred embodiment of the present invention is explained above with reference to the appended drawing, but the present invention is not limited to this example. It is clear that a person skilled in the art can conceive of various variation examples or modification examples, without departing from the scope of the invention set forth in the claims, and these variation examples and modification examples are obviously construed to belong to the technical scope of the present invention.

For example, in the embodiment above, gas circulation is performed at the abovementioned anode side, but excess water vapor or nitrogen gas may be also discharged by causing the gas to flow to the cathode side. In this case, it is possible to actuate, for example, the compressor 33, supply the air to the air flow channel 25B of the fuel cell 1 via the supply flow channel 31 and discharge the air from the discharge flow channel 32. In such a manner, the amount of water vapor or nitrogen gas inside the fuel cell 1 may be also decreased. Further, the gas may be also caused to flow to both the anode side and the cathode side. Further, in the above-mentioned embodiment, the gas is supplied to the fuel cell by gas circulation, but causing circulation is not a mandatory condition, and the present invention can be also applied to the case in which no circulation is performed.

1: fuel cell, 2: unit cell, 2*a*: main cell, 2*b*: end cell, 23: electrolyte membrane, 24A: anode electrode, 24B: cathode electrode, 25A: hydrogen flow channel (fuel gas flow channel), 25B: air flow channel (oxidizing gas flow channel), 67: estimation unit, 68: operation control unit, 100: fuel cell system, 300: air pipe system, 400: hydrogen pipe system, 500: coolant pipe system, 600: control unit.

I claim:

1. A fuel cell system including a fuel cell having a cell stack formed by stacking a plurality of unit cells each having an anode electrode, a cathode electrode, an electrolyte membrane located between the anode electrode and the cathode electrode, and a reaction gas flow channel, the fuel cell system further having:

an estimation unit that estimates a water vapor amount and a nitrogen gas amount at a plurality of predetermined positions inside the electrolyte membrane and the reaction gas flow channel of at least one unit cell;

wherein the water vapor amount is estimated by determining a residual water amount distribution in the reaction gas flow channel and a water content distribution in the electrolyte membrane in a cell plane of the unit cell with consideration for water transfer performed between the anode electrode and the cathode electrode via the electrolyte membrane;

wherein the nitrogen gas amount is estimated by determining a nitrogen gas distribution in the reaction gas flow channel in the cell plane of the unit cell with consideration for nitrogen gas transfer performed between the anode electrode and the cathode electrode via the electrolyte membrane; and an operation control unit that:

compares, during an operation stop of intermittent operation, at least either of the water vapor amount or the nitrogen gas amount at each of the predetermined positions that has been estimated by the estimation unit with a threshold for each of the predetermined positions that has been set with consideration for a stacking direction of the unit cells and a flow channel direction of the reaction gas flow channel, and supplies a gas including hydrogen gas to the reaction gas flow channel and discharges water vapor and nitrogen gas from inside the fuel cell, when at least either of the water vapor amount and the nitrogen gas amount exceeds the threshold at at least one of the positions.

2. The fuel cell system according to claim 1, wherein the reaction gas flow channel communicates with a circulation flow channel that receives hydrogen off-gas discharged from the fuel cell and recirculates the hydrogen off-gas back to the fuel cell; and the operation control unit performs gas circulation in the circulation flow channel when the threshold is exceeded.

3. The fuel cell system according to claim 2, wherein a discharge flow channel leading to the outside of the fuel cell system is connected via an opening-closing valve to the circulation flow channel; and the operation control unit opens the opening-closing valve and performs the discharge of water vapor and nitrogen gas via the discharge flow channel.

4. An operation method for a fuel cell system including a fuel cell having a cell stack formed by stacking a plurality of unit cells each having an anode electrode, a cathode electrode, an electrolyte membrane located between the anode electrode and the cathode electrode, and a reaction gas flow channel, the operation method comprising:

a step of estimating a water vapor amount and a nitrogen gas amount at a plurality of predetermined positions inside the electrolyte membrane and the reaction gas flow channel of at least one unit cell;

wherein the water vapor amount is estimated by determining a residual water amount distribution in the reaction gas flow channel and a water content distribution in the electrolyte membrane in a cell plane of the unit cell with consideration for water transfer performed between the anode electrode and the cathode electrode via the electrolyte membrane;

wherein the nitrogen gas amount is estimated by determining a nitrogen gas distribution in the reaction gas flow channel in the cell plane of the unit cell with consideration for nitrogen gas transfer performed between the anode electrode and the cathode electrode via the electrolyte membrane; and a step of comparing, during an operation stop of intermittent operation, at least either of the water vapor amount or the nitrogen gas amount at each of the predetermined positions that has been estimated by the estimation unit with a threshold for each of the predetermined positions that has been set with consideration for a stacking direction of the unit cells and a flow channel direction of the reaction gas flow channel, and a step of supplying a gas including hydrogen gas to the reaction gas flow channel and discharging water vapor and nitrogen gas from inside the fuel cell, when at least either of the water vapor amount and the nitrogen gas amount exceeds the threshold at at least one of the positions.

5. The operation method for a fuel cell system according to claim 4, wherein gas circulation is performed in which the gas discharged from the reaction gas flow channel of the fuel cell is treated and supplied to the reaction gas flow channel of the fuel cell when the threshold is exceeded.

6. The operation method for a fuel cell system according to claim 5, wherein during the gas circulation, water vapor and nitrogen gas are discharged via a discharge flow channel connected to a circulation flow channel in which the gas circulation is performed.

* * * * *

UNITED STATES PATENT AND TRADEMARK OFFICE

CERTIFICATE OF CORRECTION

PATENT NO. : 8,338,040 B2
APPLICATION NO. : 13/260015
DATED : December 25, 2012
INVENTOR(S) : Masaaki Matsusue It is certified that error appears in the above-identified patent and that said Letters Patent is hereby corrected as shown below:

In the Specifications

COLUMN 10, LINE 67:

Please change "a relative humidity a"

to --a relative humidity α--

COLUMN 11, LINES 25-29:

Please change " $I = f(T_{d, CA}, T_{d, AN}, T_{OUT, i}, P_{air, i}, P_{H2, i}, Q_{air, i}, Q_{H2, i}, V_{H2O, CA \to An}, i_x)$ "

to -- $I = f(T_{d, CA}, T_{d, AN}, T_{OUT, i}, P_{air, i}, P_{H2, i}, Q_{air, i}, Q_{H2, i}, V_{H2O, CA \to AN}, i_x)$ --

Please change " $RH = f(T_{d, CA}, T_{d, AN}, T_{OUT, i}, P_{air, i}, P_{H2, i}, Q_{air, i}, Q_{H2, i}, V_{H2O, CA \to An}, i_x)$ "

to -- $RH = f(T_{d, CA}, T_{d, AN}, T_{OUT, i}, P_{air, i}, P_{H2, i}, Q_{air, i}, Q_{H2, i}, V_{H2O, CA \to AN}, i_x)$ --

COLUMN 13, LINE 33:

Please change "the residual water amount in the unit cell Z"

to --the residual water amount in the unit cell $2_i$--

COLUMN 14, LINE 2:

Please change "$2_i$ is estimated from the I-V characteristic for each unit cell Z."

to --$2_i$ is estimated from the I-V characteristic for each unit cell $2_i$.--

Signed and Sealed this
Eleventh Day of June, 2013

Teresa Stanek Rea

*Acting Director of the United States Patent and Trademark Office*

In the Specifications

COLUMN 15, LINE 7:

Please change “flowing into the air inlet port 28*a* of the unit cell Z.”

to --flowing into the air inlet port 28*a* of the unit cell $2_i$.--

COLUMN 15, LINE 40:

Please change “pump by preceding estimations. rpm”

to --pump by preceding estimations, rpm--

COLUMN 16, LINE 35:

Please change “map by using a relative humidity a”

to --map by using a relative humidity α--

COLUMN 16, LINE 37:

Please change “cycle of the fuel cell system 1, a relative humidity a”

to --cycle of the fuel cell system 1, a relative humidity α--

COLUMN 16, LINE 64-65:

Please change “ $RH = f(T_{d,CA}, T_{d,AN}, T_{OUT,i}, P_{air,i}, P_{H2,i}, Q_{H2,i}, Q_{N2,AN,i}, V_{H20,CA\rightarrow AN,i}, V_{N2,CA\rightarrow AN}, i_x)$ ”

to -- $RH = f(T_{d,CA}, T_{d,AN}, T_{OUT,i}, P_{air,i}, P_{H2,i}, Q_{H2,i}, Q_{N2,AN,i}, V_{H20,CA\rightarrow AN}, V_{N2,CA\rightarrow AN}, i_x)$ --

COLUMN 18, LINE 57:

Please change “when the threshold is exceeded”

to --when the threshold is exceeded.--